(12) United States Patent
NewDelman et al.

(10) Patent No.: US 12,464,977 B2
(45) Date of Patent: Nov. 11, 2025

(54) DEVICE DISPENSING CONSTITUENT MATERIALS BY WEIGHT, VOLUMES, FLOWS, TIME INTERVALS, DEPTHS THROUGH ACTUATED DISPENSER OPENINGS CONNECTING CHAMBERS AND VESSELS

(71) Applicant: SUB-MERGENT TECHNOLOGIES, INC., Lake Oswego, OR (US)

(72) Inventors: Mitchell J. NewDelman, Monte Carlo (MC); John A. Sanders, Austin, TX (US)

(73) Assignee: SUB-MERGENT TECHNOLOGIES, INC., Southlake, TX (US)

( * ) Notice: Subject to any disclaimer, the term of this patent is extended or adjusted under 35 U.S.C. 154(b) by 665 days.

(21) Appl. No.: 17/876,591

(22) Filed: Jul. 29, 2022

(65) Prior Publication Data
US 2024/0032460 A1 Feb. 1, 2024

(51) Int. Cl.
*A01C 23/02* (2006.01)
*A01C 21/00* (2006.01)
*B05C 11/10* (2006.01)

(52) U.S. Cl.
CPC .......... *A01C 23/026* (2013.01); *A01C 21/002* (2013.01); *B05C 11/1005* (2013.01); *B05C 11/1026* (2013.01)

(58) Field of Classification Search
CPC ..... A01C 23/026; A01C 23/023; A01C 23/02; A01C 23/00; A01C 21/002; A01C 21/00; B05C 11/1005; B05C 11/1002; B05C 11/10; B05C 11/00; B05C 11/1026
See application file for complete search history.

(56) References Cited

U.S. PATENT DOCUMENTS

2020/0376927 A1* 12/2020 Rajaie ................ B60H 1/00764

* cited by examiner

*Primary Examiner* — Christopher J. Novosad
(74) *Attorney, Agent, or Firm* — Bailey Legal Services, PLLC

(57) ABSTRACT

A device disperses a plurality of constituent materials by one or more of weight, volume, flow, time interval, and depths through one or more actuated dispenser openings connected to one or more of a plurality of chambers and a plurality of vessels. The device includes a gate (411B); an actuator a physical gate (405B); one or more load cells (605A, 605B. and 713); an artificial intelligence (AI) robot (807C); a lens (905); a computer (811C); a programmable logic controller (PLC) (805C); an encoder (1005B); a limit switch (1209B); and a sensor. The gate (411B), the actuator a physical gate (405B); and the load cell (713) enable a sequential dispensing of one or more constituents at targeted depths via the AI robot (807C), the lens (905), the computer (811C), the PLC (805C); the encoder (1005B), the limit switch (1209B), and/the sensor. The gate (411B), the actuator a physical gate (405B); and the load cell (713) are used to dispense by the load cell (605A) measuring the constituents by weight.

27 Claims, 18 Drawing Sheets

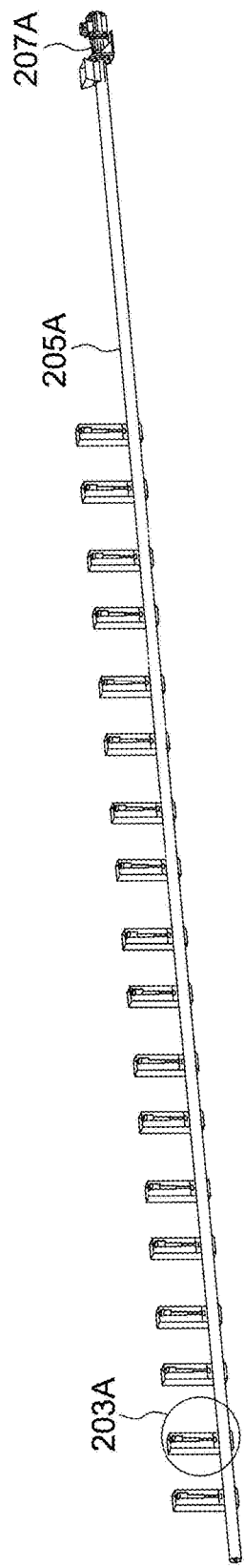
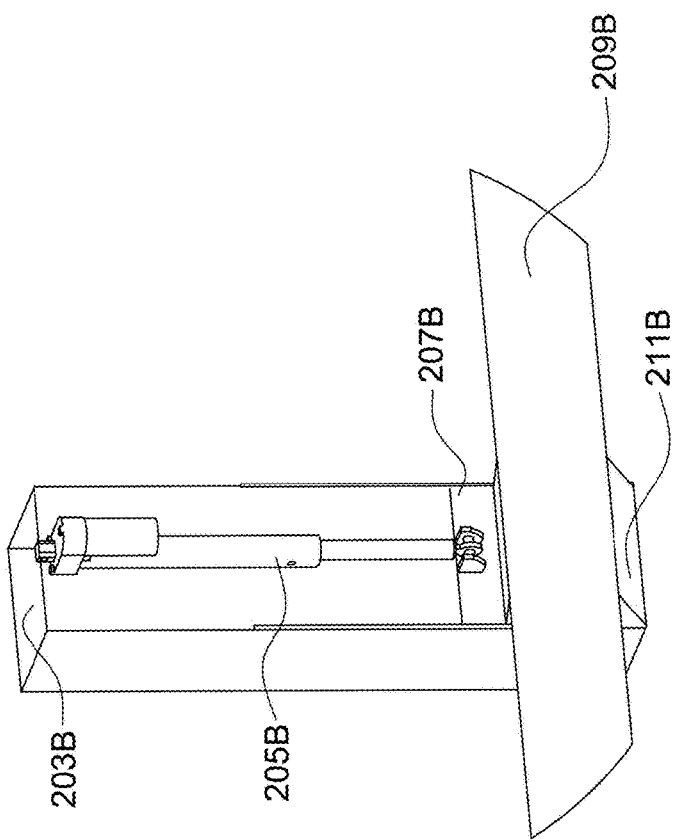
FIG. 2A
FIG. 2B

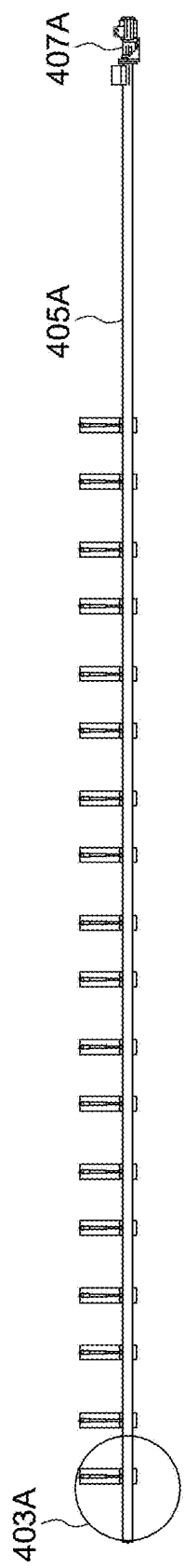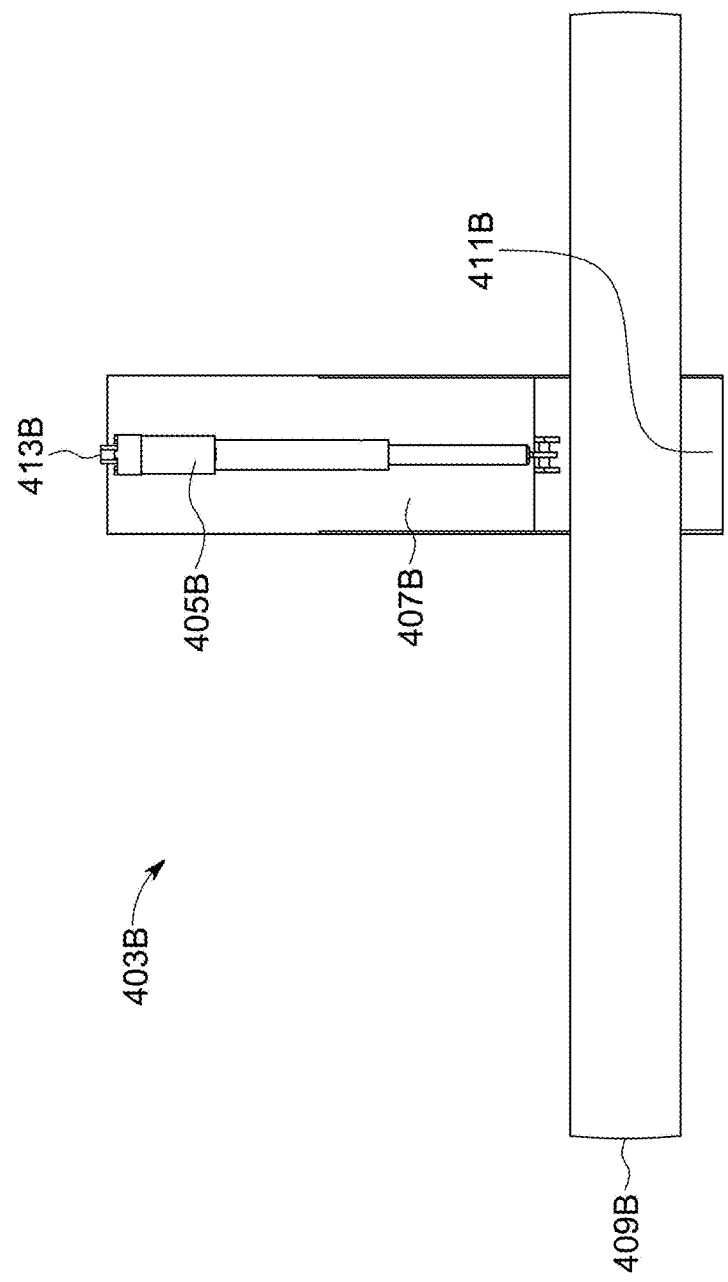

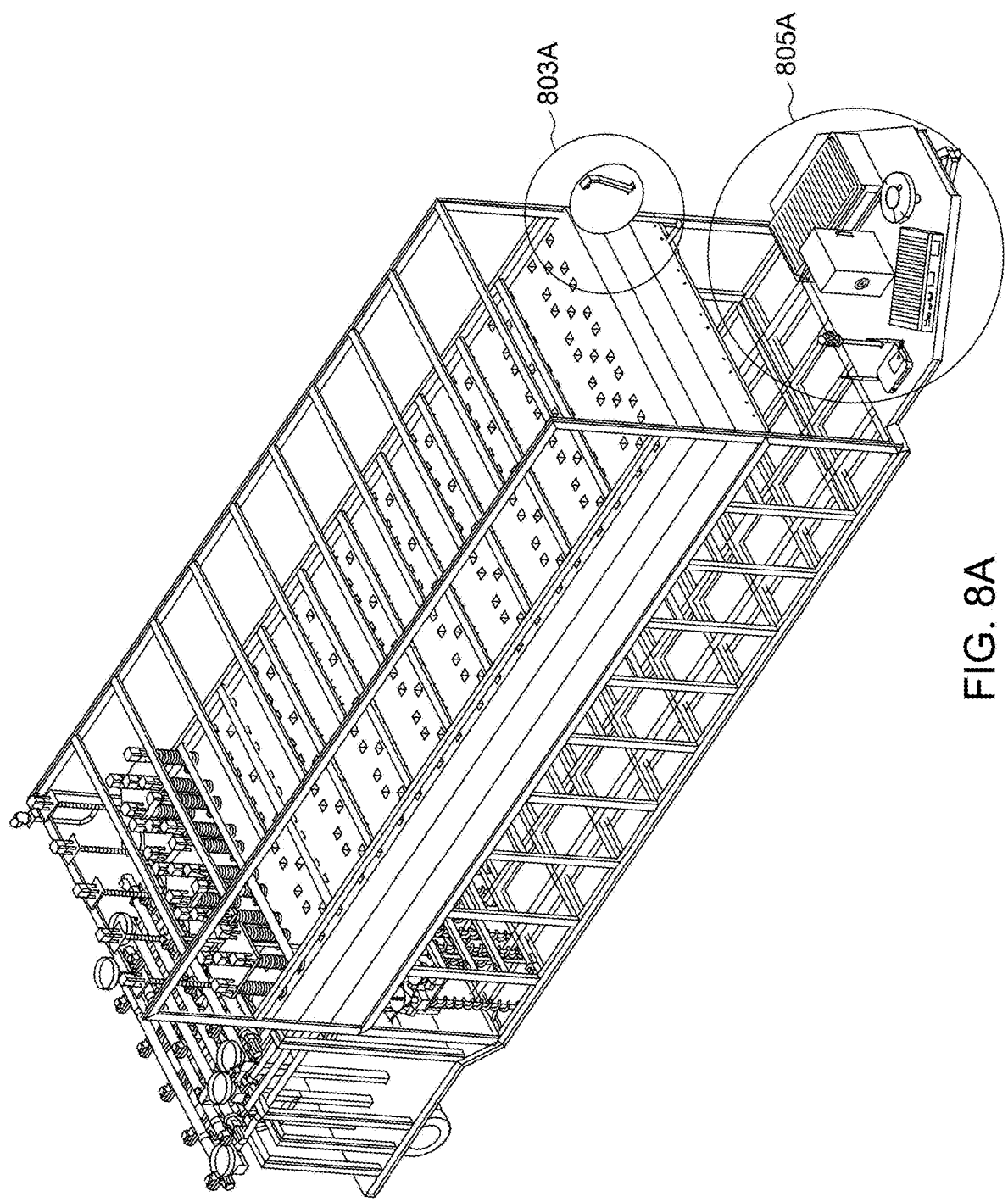

DEVICE DISPENSING CONSTITUENT MATERIALS BY WEIGHT, VOLUMES, FLOWS, TIME INTERVALS, DEPTHS THROUGH ACTUATED DISPENSER OPENINGS CONNECTING CHAMBERS AND VESSELS

TECHNICAL FIELD

The present invention is generally related to a device for dispensing constituent materials by one or more of: weight, volumes, flows, time intervals, and depths through actuated dispenser openings connected to chambers and vessels. More particularly, the present disclosure relates to a device for dispensing constituent material by weight, volume, flow, or time interval through a singular or plurality of actuated dispenser openings connected to chambers and or vessels containing assessment devices, tests, constituents by way of example but not limited to live organisms, bacteria, colloids, fungi, liquid, slurry, damp, and or dry constituents for controlled and measured dispensing of the constituents in sequence.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

With an expected world population of 9 billion by 2050, the need to produce more food and fiber is urgent. Irrigated agriculture is more productive, yet large amounts of water are required to maintain maximum yields. Agricultural science strives to improve irrigation management to minimize water inputs while optimizing crop productivity.

Innovative irrigation management could help avoid negative environmental and economic consequences of over- or under-irrigation. Under irrigation affects crop quality and yield. Over-irrigation increases topsoil erosion and the potential of property contamination due to chemical flows. Water resource depletion could consequently increase a region's susceptibility to drought. Non-optimal irrigation can provoke losses to growers, to the local community, and hence, food security.

Optimally efficient irrigation is a function of soil water status across the root zone. Prescribed soil amendment materials, either organic/in-organic and/or non-organic matter, can be injected either for soil health or for water retention.

This specification recognizes that there is a need for an efficient apparatus that can inject down to various targeted root zone sections and/or at sub-rootzone soil horizons for soil health and hence enhanced yield and/or for water retention modification for drought resilience.

Soil amendments applying biochar of many varieties have been examined for crop yield and quality as well as for regulating nitrogen level imbalances due to increased fertilizer use, for pesticide dosage, et cetera.

It is known that locally produced biochar can improve the physical condition of light-textured soils important for crop growth through increased soil aggregate stability, porosity, and available water contents where it reduced soil bulk density. Reduced bulk density due to soil aggregation may aid root growth with more water available. Biochar application to highly weathered and sandy soils will, therefore, increase the soils' resilience against drought.

There is an ever-increasing array of discrete amendments being tried to enhance soil health and/or productivity at the surface or near-surface soil horizons, as well as some rudimentary soil health amendment spiking of soils. When referencing biochar or other soil amendment application rates, the literature discusses topsoil spreading and sometimes mechanical blending down as far as 30 centimeters with surface disruption; but there are no references exist in the art to provide multiple targeted releases through injection at and below the root zone with minimal surface disruption.

European patent application EP1203522A1 filed by Hargreaves Jonathan William et al. discloses Ground injection, e.g., aeration, apparatus adapted to be mounted on or drawn by a tractor and comprising one or more tines reciprocated vertically by a crank and crankshaft-driven from a motor. Each tine defines an internal passage with outlet apertures. A piston rod connected to each tine and a cylinder has a piston that forces air into a reservoir and via a line into the passage. The mechanism is timed such that a pulse of air is injected into the ground through outlet apertures at the position of maximum penetration of the ground by each tine. Instead of air, a liquid or other gaseous substance may be injected into the ground where it is penetrated by each tine. The apparatus may include two or more rows of such tines and associated injection means.

A PCT application WO 2020/020890 A1 filed by Reid Brian J et al. discloses a solid dosage form comprising biochar and at least one pesticide and/or at least one antimicrobial, wherein said biochar and said at least one pesticide and/or said at least one antimicrobial is homogeneously mixed in said dosage form and said dosage form does not have a layered structure. The invention also provides a method for preparing the dosage form, a liquid composition comprising the dosage form, and a method of controlling pests using the dosage form.

However, none of these prior arts talk about targeted injection(s) at or below the horizon A and or below 30 cm from the surface.

The present specification further recognizes that there is a need for an efficient and cost-effective device for dispensing constituent materials by one or more of weight, volume, flow, and time intervals through actuated dispenser openings connected to chambers and vessels.

Thus, in view of the above, there is a long-felt need in the industry to address the aforementioned deficiencies and inadequacies.

Further limitations and disadvantages of conventional and traditional approaches will become apparent to one having skill in the art through comparison of described systems with some aspects of the present disclosure, as set forth in the remainder of the present application and with reference to the drawings.

SUMMARY OF THE INVENTION

A device for dispensing a plurality of constituent materials by one or more of weight, volume, flow, and time interval through one or more actuated dispenser openings connected to one or more of a plurality of chambers and a plurality of vessels is provided substantially, as shown in and/or described in connection with at least one of the figures, as set forth more completely in the claims.

An aspect of the present disclosure relates to a device for dispensing a plurality of constituent materials by one or more of weight, volumes, flows, time intervals, and depths through one or more actuated dispenser openings connected to one or more of a plurality of chambers and a plurality of vessels. The device includes a gate; an actuator a physical gate; one or more load cells; an artificial intelligence (AI) robot; a lens; a computer; a programmable logic controller (PLC); an encoder; a limit switch; and a sensor. The gate, the actuator a physical gate; and the load cell enable a sequential dispensing of one or more constituents at targeted depths via the AI robot, the lens, the computer, the PLC; the encoder, the limit switch, and the sensor. The gate, the actuator a physical gate; and the load cell are used to dispense by the load cell measuring the constituents by weight.

In an aspect, the device enables the lateral feeding of the constituents to transition into a vertical gravity conduit.

In an aspect, the gate, the actuator a physical gate, and the load cell enable dispensing of the targeted volumes of the constituents via the AI robot, the lens, the computer, the PLC, the encoder, and the limit switch, and the sensor.

In an aspect, the gate, the actuator a physical gate, and the load cell enable dispensing of targeted volumes of the multiple constituents via the AI robot, the lens, the computer, the PLC, the encoder, and the limit switch, and the sensor.

In an aspect, the gate, the actuator a physical gate, and the load cell are used to dispense by physical volume the space a constituent takes up via the AI robot, the lens, the computer, the PLC, the encoder, the limit switch, and the sensor.

In an aspect, the gate, the actuator a physical gate, and the load cell via the AI robot, the lens, the computer, the PLC, the encoder, the limit switch, and the sensor transmit instructions to enable sequential dispensing of the constituents at coordinates of a Global Positioning System (GPS).

In an aspect, the gate, the actuator a physical gate, and the load cell enable the refilling post-first injection filling of one or more hollow shaft drill bits with the constituents targeted for specific depths to achieve physical space volume dispensing efficacy.

In an aspect, the gate, the actuator a physical gate, and the load cell enable the refilling post-first injection filling of the one or more hollow shaft drill bits with the constituents targeted for specific depths to achieve weight volume efficacy.

In an aspect, the gate, the actuator a physical gate, and the load cell enable specific dispensing volumes for subsurface injection of live organisms, micro-organisms, bacteria, fungi, and constituents through the one or more hollow shaft drill bits.

In an aspect, the gate, the actuator a physical gate, and the load cell enable dispensing for time interval injections by the encoder revolution counting of a lead screw in concert with the AI robot, the lens, the computer, the PLC, the limit switch, and the sensor-controlled at the GPS location.

In an aspect, the gate, the actuator a physical gate, and the load cell enable dispensing for time interval injections by the limit switch distance traveled of the lead screw in concert with the AI robot, the lens, the computer, the PLC, the limit switch, and the sensor-controlled at the GPS location.

In an aspect, the gate, the actuator a physical gate, and the load cell enable the injection to dispense volumes during a descending drilling process of one or more hollow shaft drill bits.

In an aspect, the gate, the actuator a physical gate, and the load cell enable secondary dispensing for subsequent injection during the ascending and then a secondary descent drilling process of the one or more hollow shaft drill bits.

In an aspect, the gate, the actuator a physical gate, and the load cell enable dispensed volumes into the one or more hollow shaft drill bits.

In an aspect, the gate, the actuator a physical gate, and the load cell enable dispensed volumes into one or more feeder augers.

In an aspect, the gate, the actuator a physical gate, and the load cell enable dispensed volumes into the one or more hollow shaft drill bits to act independently.

In an aspect, the gate, the actuator a physical gate, and the load cell enable dispensed volumes into the feeder augers to act independently.

In an aspect, the gate, the actuator a physical gate, and the load cell enable independent dispensing to the one or more hollow shaft drill bits exhibiting a plurality of behaviors comprising resistance, indicated by sensor time interval, have individually stop drilling, or to stop at an interval of time, or specific achieved depth.

In an aspect, the gate, the actuator a physical gate, and the load cell enable independent dispensing to the feeder augers exhibiting behaviors comprising resistance, indicated by sensor time interval, have individually stop drilling, or to stop at an interval of time, or specific achieved depth.

In an aspect, the gate, the actuator a physical gate, and the load cell enable a stop or place on hold from dispense receipt of signal through one or more of one or more sensor(s), the AI robot, the lens, the computer, the PLC, the limit switch, the encoder, and the sensor-controlled at the GPS location from an independent hollow shaft drill bits or a plurality of hollow shaft drill bits to individually stop dispensing upon sensor detection of specified impediments.

In an aspect, the gate, the actuator a physical gate, and the load cell enable a stop dispense receipt of signal through the sensor(s) and the AI robot, the lens, the computer, the PLC, the limit switch, the encoder, and the sensor-controlled at the GPS location from the independent hollow shaft drill bits and the feeder augers to individually stop dispensing upon sensor detection of specified resistance and resume filling upon receipt of re-actuation of drilling to a new depth.

In an aspect, the gate, the actuator a physical gate, and the load cell enable via the AI robot, the lens, the computer, the PLC, and the sensor, Lidar or similar databases and other subsurface map overlay subsurface actions to continue with prescriptive volume dispensing, not to dispense or to dispense more or less based on database reference and the GPS location.

In an aspect, the gate, the actuator a physical gate, and the load cell enable dynamic sample recording of information to the AI robot, the lens, the computer, the PLC, or cloud of specific depth at the GPS location and dispense in coordination with a database matching reference.

In an aspect, the gate, the actuator a physical gate, and the load cell enable actuation through dynamic electromagnetic charging of devices by way of example but not limited to the gates within the structure of the dispensing assembly by being made of a magnetic or ferrous metal.

In an aspect, the gate, the actuator a physical gate, and the load cell enable the dynamic actuation of the gate through any motorized or mechanical means comprising an electromagnet, a solenoid, and an actuated valve.

In an aspect, the gate, the actuator a physical gate, and the load cell enable increasing the global inventory of aerable land with appropriate porosity constituents prescriptive for its ternary type.

In an aspect, the gate, the actuator a physical gate, and the load cell enable porosity modification as a function of the shape and size of solid constituents comprising aggregates affecting the bulk mass density of the targeted Horizon.

In an aspect, the gate, the actuator a physical gate, and the load cell enable dispensing and subsequent injection of living constituents comprising aneic earthworms, fungi, larva, and pupi that can improve porosity by penetrating lower horizons.

According to an embodiment herein, the present invention is related to dispensing measured amendments in sequence through a sub-surface injection system.

These features and advantages of the present disclosure may be appreciated by reviewing the following description of the present disclosure, along with the accompanying figures wherein like reference numerals refer to like parts.

BRIEF DESCRIPTION OF DRAWINGS

The accompanying drawings illustrate the embodiments of systems, methods, and other aspects of the disclosure. Any person with ordinary skills in the art will appreciate that the illustrated element boundaries (e.g., boxes, groups of boxes, or other shapes) in the figures represent an example of the boundaries. In some examples, one element may be designed as multiple elements, or multiple elements may be designed as one element. In some examples, an element shown as an internal component of one element may be implemented as an external component in another and vice versa. Furthermore, the elements may not be drawn to scale.

Various embodiments will hereinafter be described in accordance with the appended drawings, which are provided to illustrate, not limit, the scope, wherein similar designations denote similar elements, and in which:

FIG. 2A illustrates a view of an exemplary vertical material constituent aperture mechanism, in accordance with at least one embodiment.

FIG. 2B illustrates a view of an exemplary vertical material constituent aperture mechanism close-up of FIG. 2A shown in 203A with actuated gate and horizontal auger interface, in accordance with at least one embodiment.

FIG. 4A illustrates a view of an exemplary front view of a row of the vertical material constituent capture mechanism, in accordance with at least one embodiment.

FIG. 4B illustrates a view of an exemplary close-up of FIGS. 4A and 403A front view of a row of vertical material constituent gate mechanism, in accordance with at least one embodiment.

FIG. 8A illustrates an exemplary view of the communications platform of an injection drilling trailer with components seen in FIG. 8B and FIG. 8C, in accordance with at least one embodiment.

DETAILED DESCRIPTION

Figure 1A:
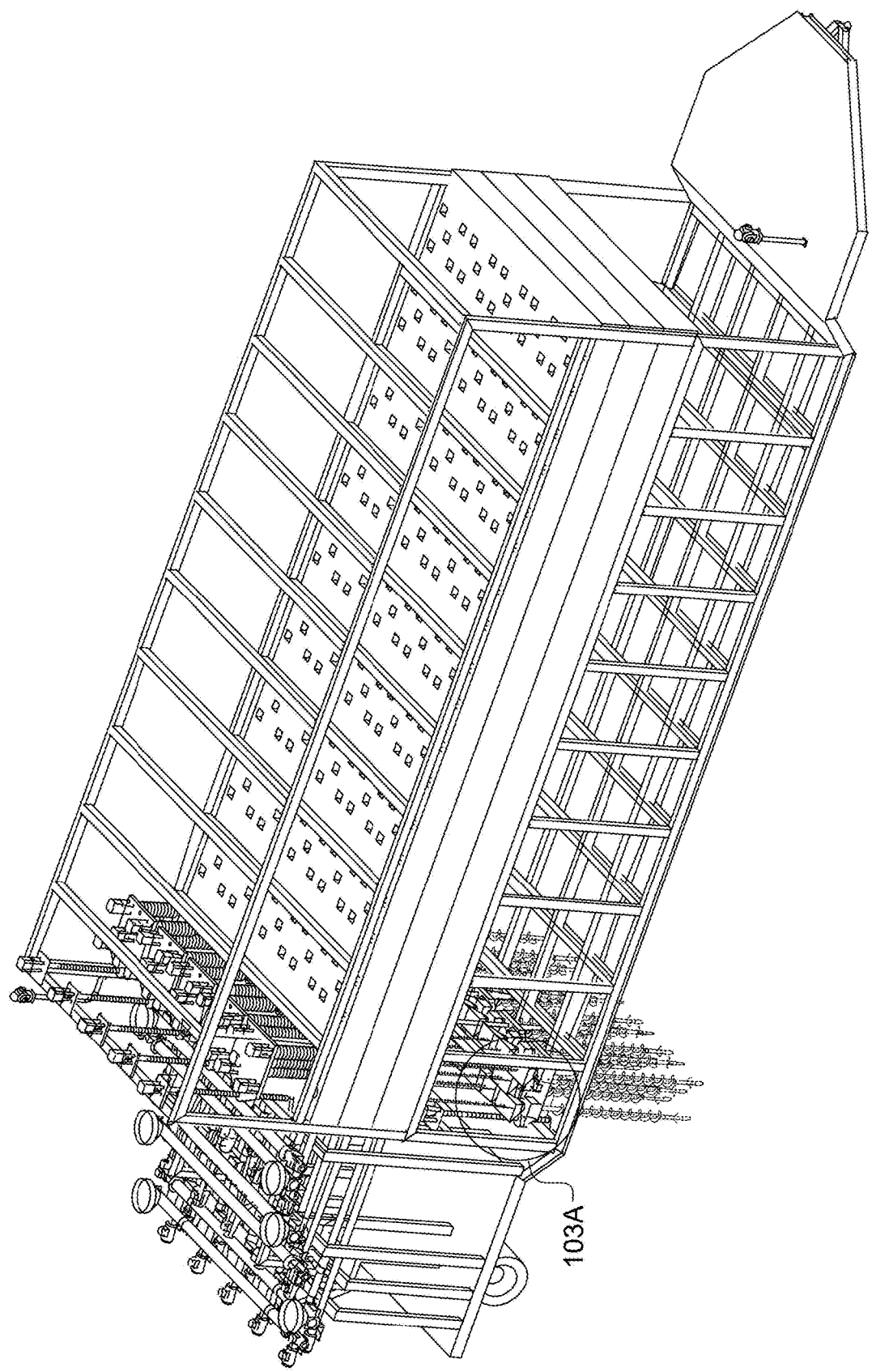
FIG. 1A illustrates an exemplary view of the injection drilling trailer, in accordance with at least one embodiment.

The present disclosure is best understood with reference to the detailed figures and description set forth herein. Various embodiments have been discussed with reference to the figures. However, those skilled in the art will readily appreciate that the detailed descriptions provided herein with respect to the figures are merely for explanatory purposes, as the methods and systems may extend beyond the described embodiments. For instance, the teachings presented and the needs of a particular application may yield multiple alternative and suitable approaches to implement the functionality of any detail described herein. Therefore, any approach may extend beyond certain implementation choices in the following embodiments.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

Methods of the present invention may be implemented by performing or completing manually, automatically, or a combination thereof, selected steps or tasks. The term "method" refers to manners, means, techniques, and procedures for accomplishing a given task including, but not limited to, those manners, means, techniques, and procedures either known to, or readily developed from known manners, means, techniques and procedures by practitioners of the art to which the invention belongs. The descriptions, examples, methods, and materials presented in the claims and the specification are not to be construed as limiting but rather as illustrative only. Those skilled in the art will envision many other possible variations within the scope of the technology described herein.

The invention teaches a device for dispensing constituent materials by weight, volume, flow, or time interval through a singular or plurality of actuated dispenser openings connected to chambers and or vessels containing assessment devices, tests, and constituents by way of example but not limitation live organisms, bacteria, colloids, fungi, liquid, slurry, damp, and or dry constituents for controlled and measured dispensing of the constituents in sequence. A dispensing mechanism and method that references databases of soil types, and soil health, actuated via computer communication and then dispensing prescriptively.

According to a first embodiment of the present invention, it enables sequential dispensing of materials at targeted depths.

According to a second embodiment of the present invention, it enables dispensing of targeted volumes of material.

According to a third embodiment of the present apparatus, it enables the refilling post-first injection filling of hollow shaft drill bits with constituents targeted for specific depths to achieve volume efficacy.

According to a fourth embodiment of the present invention, it enables specific dispensing volumes for subsurface injection of live organisms, microorganisms, bacteria, fungi, gases, colloid, liquid, damp, slurry, steam, and dry constituents through one or a plurality of hollow shaft drill bits.

According to a fifth embodiment of the present invention, it enables dispensing volumes for a sequence of constituents to be injected.

According to a sixth embodiment of the present invention, it enables dispensing for time interval injections.

According to a seventh embodiment of the present invention, it enables the injection of dispensed volumes during the descending drilling process.

According to an eighth embodiment of the present invention, it enables secondary dispensing for subsequent injection during the ascending and then secondary descent drilling process.

According to the ninth embodiment of the present invention, it enables dispensed volumes of injection drill bit and or hollow shaft feeder augers or a plurality of injection drill bits and or hollow shaft feeder augers to act independently.

According to the tenth embodiment of the present invention, it enables independent dispensing to hollow shaft drill bits and or hollow shaft feeder augers exhibiting behaviors by way of example but not limited to have individually stop drilling, or to stopped at an interval of time, or specific achieved depth.

According to the eleventh embodiment of the present invention, it enables a stop dispense receipt of signal through the sensor(s) and or AI Robotically, Computer, PLC, and or Sensor from independent hollow shaft drill bits and or hollow shaft feeder augers to individually stop dispensing upon sensor detection of specified impediments.

According to the twelfth embodiment of the present invention, it enables a stop dispense receipt of signal through the sensor(s) and or AI Robotically, Computer, PLC, and or Sensor from independent hollow shaft drill bits and or hollow shaft feeder augers to individually stop dispensing upon sensor detection of specified resistance and resume filling upon receipt of re-actuation of drilling to a new depth.

According to the thirteenth embodiment of the present invention, it enables via artificial intelligence and or AI Robotically, Computer, PLC and or Sensor Lidar or similar databases and or other subsurface map overlay subsurface actions to continue with prescriptive volume dispensing, not to dispense or to dispense more or less based on the database reference.

According to the fourteenth embodiment of the present invention, it enables dynamic sample recording of information to AI Robotically, PLC and or Sensor and or local Computer or Cloud of specific depth at GPS location and dispense in coordination with database matching reference.

According to the fifteenth embodiment of the present invention, it enables the dynamic electro-magnetic charging of devices by way of example but not limitation gates within the structure of the dispensing assembly by being made of a magnetic or ferrous metal.

According to the sixteenth embodiment of the present invention, it enables the dynamic actuation of a gate through any motorized or mechanical means by way of example but does not limit to a solenoid or actuated valve.

According to the seventeenth embodiment of the present invention, it enables the universal Aim to increase the global inventory of arable land with appropriate porosity Constituents prescriptive for its ternary type. Porosity modification is a function of the shape and size of solid constituents such as but not by way of limitation, aggregates affecting the bulk mass density of the targeted Horizon. Likewise living constituents such as but not by way of limitation, aneic earthworms can improve Porosity by penetrating below Horizon A.

Definitions

"Abrasives": means any constituent capable of inhibiting smearing. By way of example, Abrasives include but are not limited to walnut shells, pecan shells, and corn stover.

"Actuated": A device that causes a machine or other device to operate open or close and dispense a volume of material by way of example but not limited to a gate or valve opening or closing.

"Actuated Aperture Closure": a device that causes a machine or other device to operate and close "Actuator": Device which opens and closes gates and is weight alone and or AI Robotically, Computer, PLC and or Sensor triggered through an event by way of example but not limitation volume, the weight of constituents, and or sequence.

"Actuated Dispenser Opening": Any aperture opening or closing mechanism by way of example but not limited to a gate, or valve, that is PLC or Computer and or AI Robot, triggered by net weight, Gravimetric loss-in-weight dosing dispensers, Constituent flow rate, or volume. Actuated dispenser opening can be made of materials with sufficient tensile strength by means of illustration and is not limited to aramids, metals, alloys, composites, and plastics.

"Actuated Gates": means an Aperture or opening.

"Amendment Material": can also mean Constituents and or when used herein means any substance known to render a productivity advantage or benefit to sub-optimal soils and/or which provides any remediation benefit to such soils; and includes any biochar, compost, bacterial humus, and soil nutrients, fertilizers and fungi, particularly mycorrhizal fungi and mycorrhizal spores.

"Antimicrobial": is an agent that kills micro-organisms or stops their growth. Antimicrobials can be grouped according to the microorganisms they act primarily against. For example, antibiotics are used against bacteria, and antifungals are used against fungi.

"Aperture": means an orifice or opening.

"Auger Array": A multiple of hollow shaft drilling injection drill bits or feeder augers sharing the same damping platform.

"Baits": Any agent that attracts a pest or an unwanted organism. By way of example and not meant to be limiting, Baits for insects are often food-based baits and are an effective and selective method of insect control. Typically, a bait consists of a base material called a carrier (often grain or animal protein) plus a toxicant (most often insecticides by way of example but not limitation organophosphates, carbamates, or pyrethroids) and sometimes an additive (usually oil, sugar or water) to increase attractiveness. The toxicant part of bait can also be biological rather than chemical. Examples of biological toxicants are *Bacillus thuringiensis* (Bt), parasitic nematodes, and fungi. Many baits are not highly attractive to the insect but instead function as an arrestant. Baits for rodents are generally cereal-based and made of grains such as oats, wheat, barley, corn, or a combination thereof. Formulations may also contain other ingredients such as adherents to bond the toxicant to the grain particles.

"Ball Screw": A high-efficiency feed screw with the ball making a rolling motion between the screw axis and the nut. Compared with a conventional sliding screw, this product has drive torque of one-third or less, making it most suitable for saving drive motor power.

"Chemical": This means a compound or substance that has been purified or prepared, especially artificially for purposes of sub-surface amendment, by way of example but not limited to fertilizers, sorption materials like zeolites, fungicides, herbicides, and insecticides. A chemical can mean any basic substance which is used in or produced by a reaction involving changes to atoms or molecules by way of example but is not limited to any liquid, solid, or gas.

"Cloud Computing": is a model for enabling ubiquitous, convenient, on-demand network access to a shared pool of configurable computing resources (e.g., networks, servers, storage, applications, and services) that can be rapidly provisioned and released with minimal management effort or service provider interaction.

"Colloids": are uniform mixtures that don't separate or settle out. While colloidal mixtures are generally considered to be homogeneous mixtures, they often display heterogeneous quality when viewed on the microscopic scale. There are two parts to every colloid mixture: the particles and the dispersing medium. The colloid particles are solids or liquids that are suspended in the medium. These particles are larger than molecules, distinguishing a colloid from a solution. However, the particles in a colloid are smaller than those found in a suspension. In smoke, for example, solid particles from combustion are suspended in a gas. Colloids include, Examples of colloids include by way of examples but are not limited the following fog, smoke, and foam.

"Conduit": means a pipe or vessel of any polygonal shape that contains a flight or Feeder Auger.

"Computer": An electronic device for storing and processing data, typically in binary form, according to instructions given to it in a variable program. May include by way of specificity an AI Robot.

"Constituent": Any soil amendment material byway of example but not limitation abrasives, aggregate, amendments, minerals, lime, calcium, calcium carbonate, abrasives, antimicrobials, baits, bio-char, biologicals, bio-mass, carbon including activated, chemicals, colloids, compost, eco colonies, pre cursors to the eco colony, living organisms, inoculants, gas or any other material that can be injected sub surface to change the soil composition and or temperature. Constituents can mean chemical pesticides or natural biologicals for unwanted pests. Solid Constituents can be any polygonal shape, by way of example but are not limited to fines, granules, pellets, briquettes, blocks, or larger fragments that can fit inside and be ejected from a hollow shaft drill bit. Colloids regardless of phase state are considered as constituents. Constituents can contain doses of other constituents. Constituents also include Sorption or Sorbents materials. Constituents are of any substance that can positively add to the sub-surface area being amended.

"Copper Bands": The windings are flat copper strips to withstand the Lorentz force of the magnetic field. Electricity in the wire passes into the slip ring to make it into a magnet. A copper band includes any conductive material or alloy.

"Coupling, Gear Box Couplings, Gear Box Disc Coupling": Transmit torque from a driving to a driven bolt or shaft tangentially on a common bolt circle. Gear Box couplings are designed to transmit torque between two shafts that are not collinear. They typically consist of two flexible joints-one fixed to each shaft-which are connected by a spindle, or third shaft. A flange within the drawings below or at the top of a gearbox is Disc Couplings.

"Damping": A decrease in the amplitude of an oscillation as a result of energy being drained from the system to overcome frictional or other resistive forces. For highly demanding drilling equipment, the stress on the dampers is particularly great, but this does not produce a problem for friction springs. The increased compressed air requirements and the high damping are ideal for such applications. Furthermore, the increased reliability of friction springs by virtue of their design is a decisive advantage over other damping systems. In this case, the friction spring does not only provide for energy absorption but also compensates for clearances, which may occur between the individual components during continuous operation.

"Density": Bulk density, also called apparent density or volumetric density, is a property of powders, granules, and other "divided" solids, especially used in reference to mineral components (soil, gravel), chemical substances.

"Dispensing Actuator": Actuators that open or close based on a singular measurement by way of example but not limitation weight and or on AI Robotically, Computer, PLC, and or Sensor events by way of example but not limitation volume, weight, and or sequence.

"Drill Bit" or "Drill Bit Tip": Any device capable of making a subsurface hole when connected to a power source with perforation holes or apertures, which may be any polygon with equal or unequal side lengths, and is manufactured from alloys, steel, titanium, manganese or other materials. The drill bit may contain industrial diamonds for sub-surface injection cavity creation.

"Dry Constituents": defined as materials by way of example but not limitation any material or substrate without significant liquid content by way of example but not limitation rock, mineral, biomass, biochar, or fertilizer.

"Eco Colony": Any subsurface space that is created by the injection of preferred constituents as established or precursor natural habitat for any specific desirable living organism.

"Eco Colony Pre Cursors": Injected subsurface Eco Colony habitat that is not populated by inhabitant colony.

"Encoders": Encoders are used in machinery for motion feedback and motion control. Encoders are found in machinery in all industries. Encoders (or binary encoders) are the combinational circuits that are used to change the applied input signal into a coded format at the output. These digital circuits come under the category of medium-scale integrated circuits. In our case, they assist in-depth assessment and or achievement. Encoders through communication with PLC, computer, or AI robotics and other interactive devices can trigger drilling platform ascent or descent or deployment and or retraction stacking of plunger. Depth achievement can trigger dispensing, plunger instructions, reamer wings, continued drilling or ascent, and then descent or repetition of these actions.

"Fastener Ring": A ring feature as part of the Plunger Panel that holds Plunger Panels in shut-stacked, deployed, or in the right position and attached to the motor shaft "Feeder Auger": Examples of feeder augers that feed the materials to the Drilling Auger or its drilling inner tube, include feeder flexible conveyor flight screws, flexible conveyor flight beveled round wire screws, flexible conveyor flight beveled square wire screws, flexible conveyor flight beveled wire screws and flexible conveyor flight flat wire screws.

"Flange": A projecting flat rim, collar, or rib on an object, serving to strengthen or attach. A flange is a rib or rim for strength, for guiding, or for attachment to another object. Where a flange appears in a drawing associated with a hollow shaft injection drill bit can also mean a Gear Box Coupling and or Gear Box Disc Coupling.

"Flexible Conveyor Flight Beveled Round Wire Screws": For applications where material flow is typically semi-free flowing to sluggish flowing, and material characteristics are highly abrasive, granular, flake, pellet, or irregular shape; the round bar wire screw provides excellent conveying of materials by way of example but not limitation: fine granules, zeolites, small bean-like pellets, and polymer regrind.

"Flexible Conveyor Flight Beveled Square Wire Screws": For applications where the material flow can be free-flowing, semi-free flowing, or sluggish, and material characteristics are highly abrasive, with high bulk density; the square bar wire screw provides highly efficient conveying of materials by way of example but not limitation: sand, heavy density powders, and large biochar.

"Flexible Conveyor Flight Beveled Wire Screws": For applications where material flow is typically semi-free flowing to sluggish flowing, and material characteristics are sticky, with tendencies to pack, smear, cake, or crumble: the beveled wire screw may have a wide-face design for conveying of materials by way of example but not limitation: iron oxide, zinc oxide, powders, and carbon black.

"Flexible Conveyor Flight Flat Wire Screws": For applications where material flow is typically free-flowing to semi-free-flowing, and material characteristics are lightweight, highly aerated, powdered, or fluidizing; the flat wire screw may have a wide-face design for conveying of materials by way of example but not limitation: calcium carbonate, fumed silica, and biochar fines.

"Flight Conduit Outer Tubes": Within this space a separate channel such as a smaller diameter or perimeter tube incorporated into the side wall or an appendix to a Conduit Tube.

"Friction Spring": Friction springs consist of precisely manufactured outer and inner rings which touch each other on their tapered faces. Friction springs are indispensable safety components in all fields of technology where suddenly occurring forces have to be taken up and kinetic energy absorbed, or where springs are required with relatively compact dimensions while also being able to sustain high forces. Expert friction springs are needed when it comes to the deceleration of moving masses in a quick, safe, and precise manner.

"Fuel Cell": A cell producing an electric current directly from a chemical reaction. Or may also refer to a rechargeable battery.

"GPS" "Global Positioning Satellite": An accurate worldwide navigational and surveying facility based on the reception of signals from an array of orbiting satellites.

"Gear Box": The gearbox is a mechanical device used to increase the output torque or to change the speed (RPM) of a motor. The shaft of the motor is connected to one end of the gearbox and through the internal configuration of gears of a gearbox, provides a given output torque and speed determined by the gear ratio.

"Ground Level": Something at ground level, at the same level as the soil, rock, or water surface, as opposed to being higher up or below the surface.

"Hollow Shaft": Any injection auger and or drill bit space between the walls, space may be cylindrical or any polygonal shape.

"Hollow Shaft of injection Drilling Auger": A cylinder, threaded cylinder, or corkscrew and has multiple parts: collar, bottom aperture, window aperture, spillway, perforations, wings, screw, spurs, cutting edges, twist, shank, and in some cases a tang.

"Hollow Shaft Injection Drilling Bit": Auger bits have adjustable blades with cutting edges and spurs that can be extended radially to cut large holes.

"Hollow Shaft Injection Drill Bit Screw Rib": Any rib on the side of the shaft of an auger drill bit or any drill bit.

"Hollow Shaft Channel": Any injection auger and or drill bit space between the walls, space may be cylindrical or any polygonal shape. Within this space, a separate channel such as a smaller diameter or perimeter tube is incorporated into the side wall or an appendix to a Flight Conduit Outer Tubes.

"Hollow Shaft of Injection Drilling Auger Array": A helical and or corkscrew and has multiple parts: collar, bottom aperture, window aperture, spillway, perforations, wings, screw, spurs, cutting edges, twist, shank. Expansive auger bits have adjustable blades with cutting edges and spurs that can be extended radially to cut large holes.

"Hollow Shaft of Injection Drilling Auger Array Member": A helical and or corkscrew and has multiple parts: collar, bottom aperture, window aperture, spillway, perforations, wings, screw, spurs, cutting edges, twist, shank. Expansive auger bits have adjustable blades with cutting edges and spurs that can be extended radially to cut large holes.

"Hopper": A container for a bulk material by way of example but not limited to injectable constituents, typically one that tapers downward and can discharge its contents at the bottom or a side panel.

"Injection Drilling Bit": Either a bayonet, flat, impregnated head, screw, auger, fish tail, or any shape that can penetrate a sub-surface environment. Any hollow shaft device of any polygonal width or diameter that is capable of penetration of ice, soil, rock, and or mineral.

"Injection Drill Bit Auger Extension": A connection segment for devices used in sub-surface operations. Some examples are Windows, Apertures, and Wings.

"Injection Drill Bit Screw": A tapered shape drilling bit or cylindrical shape with threads like a screw, with or without perforations.

"Inoculants": A constituent (a virus or toxin or immune serum) that is introduced into the sub-surface of the soil to produce or increase immunity to an undesirable living organism.

"Lead Screw": A threaded rod that drives the platform tool carriage in a drill or drilling array when subsurface drilling. The lead screw can also be a ball screw, worm screw, or worm gear.

"Limit Switch": a switch preventing the travel of an object in a mechanism past some predetermined point, mechanically operated by the motion of the object itself. Limit Switches are found in machinery in all industries. In this application assist in communicating depth achievement for ascent or descent communicating to PLC, Computer, or AI robotics and other interactive devices. Depth achievement can trigger dispensing, plunger instructions, reamer wings, continued drilling or ascent, and then descent or repetition of these actions. A Limit Switch can refer to a plurality.

"Living Organisms": An individual form of life, by way of example but not limitation a bacterium, protist, fungus, plant, or animal, composed of a single cell or a complex of cells in which organelles or organs work together to carry out the various processes of life, including in some circumstances virus.

"Load Cell" or "Load Switch": is a force transducer, that converts a force such as tension, compression, pressure, or torque into an electrical signal that can be measured and standardized. As the force applied to the load cell increases, the electrical signal changes proportionally. Examples of Load Cells but not by way of limitation include "Weight Transducer, Weight Sensors, Strain Gauge".

"Magnetic Metals": Include ferromagnetic metals by way of example but are not limited to iron, nickel, cobalt, gadolinium, dysprosium, and alloys such as steel that also contain specific ferromagnetic metals by way of example but not limitation iron or nickel.

"Minerals": A solid chemical compound with fairly well-defined chemical composition and a specific crystal structure that occurs naturally in pure form.

"Organic Matter": Organic matter, organic material, or natural organic matter refers to the large source of carbon-based compounds found within natural and engineered, terrestrial, and aquatic environments. It is matter composed of organic compounds that have come from the feces and remains of organisms such as plants and animals. In soils, dead matter makes up roughly 85% of the organic matter. Organic matter includes dead matter, living microbes, and living parts of plants (e.g., roots). Organic Matter includes the four basic types pure substance that cannot be broken down into other types of substances; lipid organic compound such as fat or oil; matter anything that takes up space and has mass; monosaccharide simple sugar such as glucose that is a building block of carbohydrates; nucleic acid organic compound such as DNA or RNA; nucleotide.

"Platform": A ledge or shelf with damping.

"PLC": A programmable logic controller (PLC) is a small, modular solid-state computer with customized instructions for performing a particular task. PLCs, which are used in industrial control systems (ICS) for a wide variety of industries, have largely replaced mechanical relays, drum sequencers, and cam timers. PLCs are used for repeatable processes and have no mechanical parts and they can gather information from sensors. PLC can also mean a computer, and or remote Cloud computer.

"Polygon": a plane figure with at least three straight sides and angles, and typically five or more.

"Porosity Soil" or "Soil Porosity": refers to the quantity of pores, or open space, between soil particles. Pore spaces may be formed due to the movement of roots, worms, and insects; expanding gases trapped within these spaces by groundwater; and/or the dissolution of the soil's parent material. Soil texture can also affect soil porosity. There are three main soil textures: sand, silt, and clay. Sand particles have diameters between 0.05 and 2.0 mm (visible to the naked eye) and are gritty to the touch. Silt is smooth and slippery to the touch when wet, and individual particles are between 0.002 and 0.05 mm in size. Clay is less than 0.002 mm in size and is sticky when wet. The differences in the size and shape of sand, silt, and clay influence the way the soil particles fit together, and thus their porosity.

"Process Methodology Diagram": An illustrative process step by step to show the function of an embodiment.

"Router": is a network hardware device equipped with a cellular hot spot that allows making communication between the internet and all devices which are linked to the internet in your house and office. The router has responsible to receives, analyze, and forwarding all data packets from the modem and transferring it to the destination point.

"Satellite Dish": a bowl-shaped antenna with which signals are transmitted to or received from a communications satellite.

"Slip Ring" or "Slip Ring Bore Hole": a ring in a dynamo or electric motor which is attached to and rotates with the shaft, passing an electric current to a circuit via a fixed brush pressing against it. A Slip Ring with a hollow shaft creates a bore hole for an injection drill bit shaft.

"Sorption" or "Sorbents" Are Constituents capable of adsorbing/absorbing one or more constituents in gas, fluid, liquid, or a mixture thereof. Examples include activated carbon, atomic particles, bio-char, carbon materials, activated carbon, carbon nanotubes, catalysis, graphene, metal hydrides, nanoparticles, nano-structured materials, polymeric organic frameworks, silica, silica gel, clay, zeolites, other adsorbents/absorbents, or combination thereof. Useful adsorbents/absorbents, by way of example but not limitation carbon materials, have high surface areas and a high density of pores with optimal diameter. Sorption or Sorbents can be different types of activated charcoal and zeolites. Sorption or Sorbents may also be combinations that vary by type(s) of metal ions and/or organic material(s) used and may be made in molecular clusters or molecular chains to obtain the desired quality, i.e., type of adsorption/absorption, and volume capacity in terms of the desired porosity. Examples of sorption or sorbents also include constituents by way of example but are not limited to bio-char and zeolites.

"Suspended": Suspended is defined as suspension which is a heterogeneous mixture in which the solute particles do not dissolve but get suspended throughout the bulk of the medium. Emulsions are a type of suspension, where two immiscible liquids are mixed together. Any constituents that are liquid or particle held in suspension.

"Subsoil": is the layer of soil below the topsoil. The layer of soil closest to our feet is topsoil. Geologists refer to it as the "A" horizon, whereas subsoil is the "B" horizon. Topsoil is much more fertile than subsoil because it contains more organic matter, thus giving it a darker color. As per the soil profile, this is a kind of soil that lies below the surface soil but above the bedrocks, it is also called undersoil or B Horizon soil. It lies between C Horizon and E Horizon. The B Horizon predominantly consists of leached materials as well as minerals such as iron and Al compounds. Living Organisms aid soil fertility but these organisms because of Porosity spend very little time below Top Soil below root zones and into Subsoils.

"Suspensions": An emulsion is a suspension of two liquids that usually do not mix together. These liquids that do not mix are said to be immiscible. An example would be oil and water.

"Weight Transducer, Weight Sensors, Strain Gauge": These are load cells that are defined as a transducer that converts an input mechanical load, weight, tension, compression, or pressure into an electrical output signal (load cell definition). Weight Sensors are also commonly known as weight transducers. There are several types of load cells based on size, geometry, and capacity. Weight transducers or sensors, convert an input mechanical force such as load, weight, tension, compression, or pressure into another physical variable, in this case, into an electrical output signal that can be measured, converted, and standardized. As the force applied to the sensor increases, the electrical signal changes proportionally. Examples of Weight Transducers and Sensors include but not by way of limitation a Metal Foil Strain Gauge. The metal foil strain gauge is a sensor whose electrical resistance varies with applied force. It converts (or transduces) force, pressure, tension, compression, torque, and weight, into a change in electrical resistance, which can then be measured. Strain gauges are electrical conductors tightly attached to a film in a zigzag shape. When this film is pulled, it—and the conductors—stretches and elongates. When it is pushed, it is contracted and gets shorter. This change in shape causes the resistance in the electrical conductors to also change. The strain applied in the load cell can be determined based on this principle, as strain gauge resistance increases with applied strain and diminishes with contraction. These output load cell signals in conjunction with a PLC, Computer, or AI Robot can determine closures and signal augers to reload for the next load cell ejection.

"Weight Measured Aperture Gate": An aperture that is triggered by sensor and or PLC by the weight of the constituent.

"Worm Screw and Worm Gear": Used to transmit motion and power when a high-ratio speed reduction is required. Worm Screws and Worm Gears accommodate a wide range of speed ratios.

"Zeolites": Any of various hydrous silicates that are analogous in composition to the feldspars, occur as secondary minerals in cavities of lavas, and can act as ion-exchangers. Any of various natural or synthesized silicates of similar structure are used especially in water softening and as adsorbents and catalysts. Zeolites offer the capability of salinity and boron remediation. Clinoptilolite (a naturally occurring zeolite) is used as a soil treatment in agriculture. It is a source of potassium that is released slowly. They can adsorb effluent and ammonia, and subsequently be used as soil nutrients.

FIG. 1A illustrates an exemplary view of the injection drilling trailer, in accordance with at least one embodiment. FIG. 1A depicts an injection drilling trailer constituent compartment with arrays of vertical rectangular conduits with actuated gates and horizontal feeder augers 103A, an injection drilling trailer hoppers and drills 105A, and PLC, computer, or AI unit 107A.

Figure 1B:
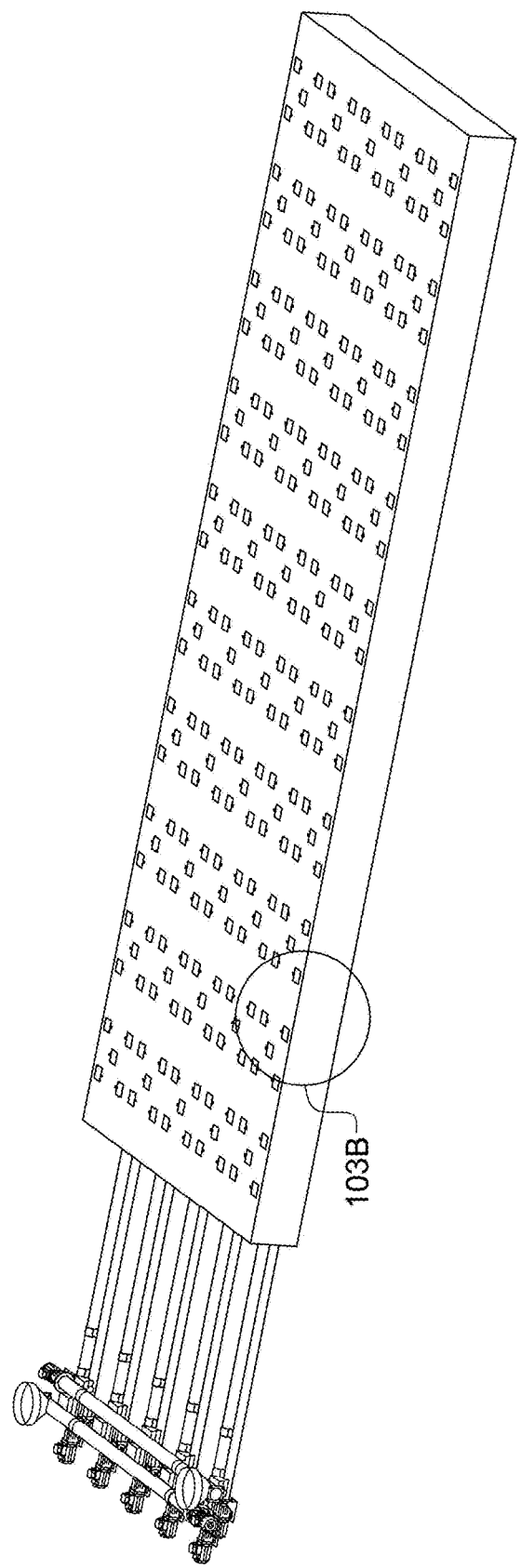
FIG. 1B illustrates an exemplary view of an internal close-up of FIG. 1A and detailed in 103A, in accordance with at least one embodiment.

FIG. 1B illustrates an exemplary view of an internal close-up of FIG. 1A and detailed in 103A, in accordance with at least one embodiment. FIG. 1B depicts an injection drilling trailer constituent compartment 103B showing an array of unpopulated rectangle conduits within the platform for arrays of vertical rectangular conduits with actuated gates and horizontal feeder augers.

Figure 1C:
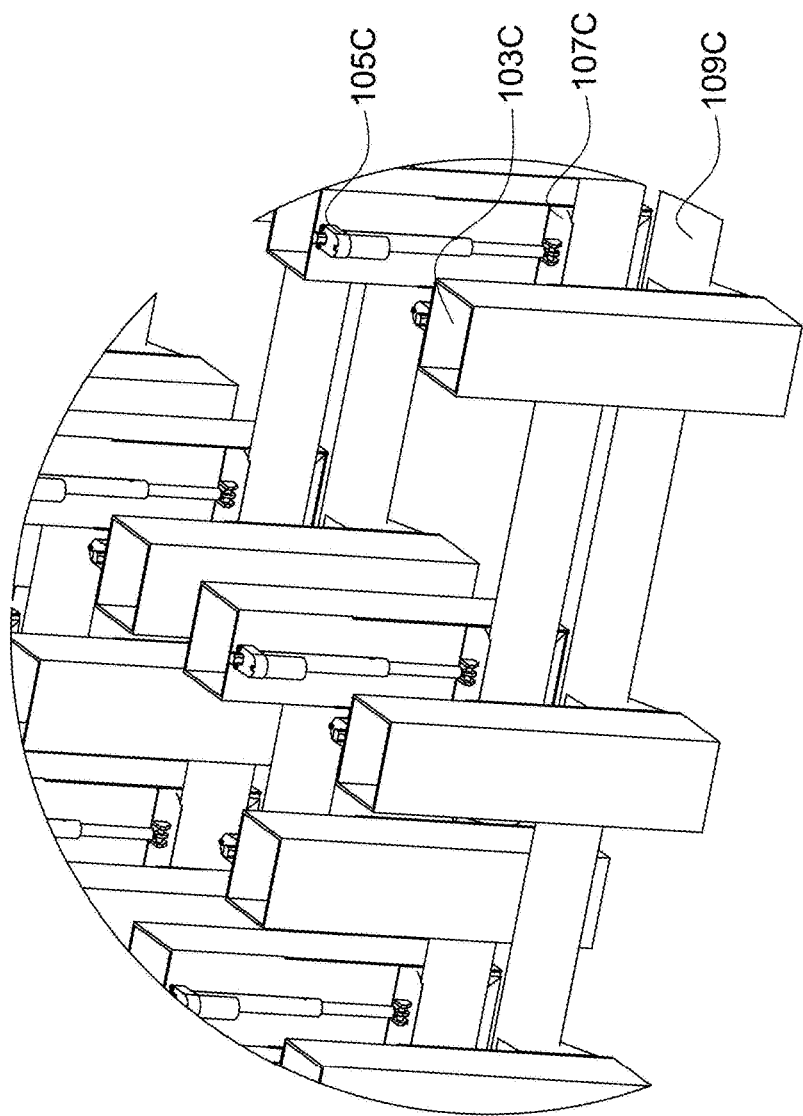
FIG. 1C illustrates a view of an exemplary view of the third compartment as seen in FIG. 1B and detailed in 103B showing material vertical conduits, gates, and horizontal material constituent auger conduits, in accordance with at least one embodiment.

FIG. 1C illustrates a view of an exemplary view of the third compartment as seen in FIG. 1B and detailed in 103B showing material vertical conduits, gates, and horizontal material constituent auger conduits, in accordance with at least one embodiment. FIG. 1C depicts a close-up of one vertical rectangular conduit 103C within populated arrays of vertical rectangular conduits with actuated gates and horizontal feeder augers, actuator 105C, a gate 107C, and a horizontal feeder auger 109C.

FIG. 2A illustrates a view of an exemplary vertical material constituent aperture mechanism, in accordance with at least one embodiment. FIG. 2A depicts a rectangular conduit with an actuator for gate 203A, a feeder auger for rectangular conduit 205A, and a motor for rectangular conduit feeder auger 207A.

FIG. 2B illustrates a view of an exemplary vertical material constituent aperture mechanism close-up of FIG. 2A shown in 203A with actuated gate and horizontal auger interface, in accordance with at least one embodiment. FIG. 2B depicts a hollow area of rectangular conduit 203B, an actuator 205B, a partially actuated opened gate 207B, and a feeder auger for rectangular conduit 209B.

Figure 3C:
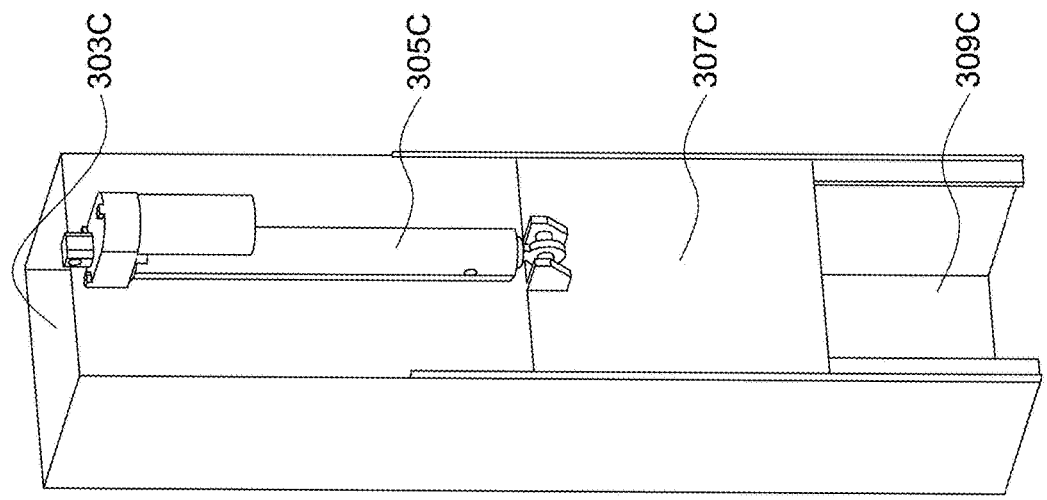
FIG. 3C illustrates a view of an exemplary vertical material constituent aperture mechanism whose gate is in a fully opened position, in accordance with at least one embodiment.
Figure 3B:
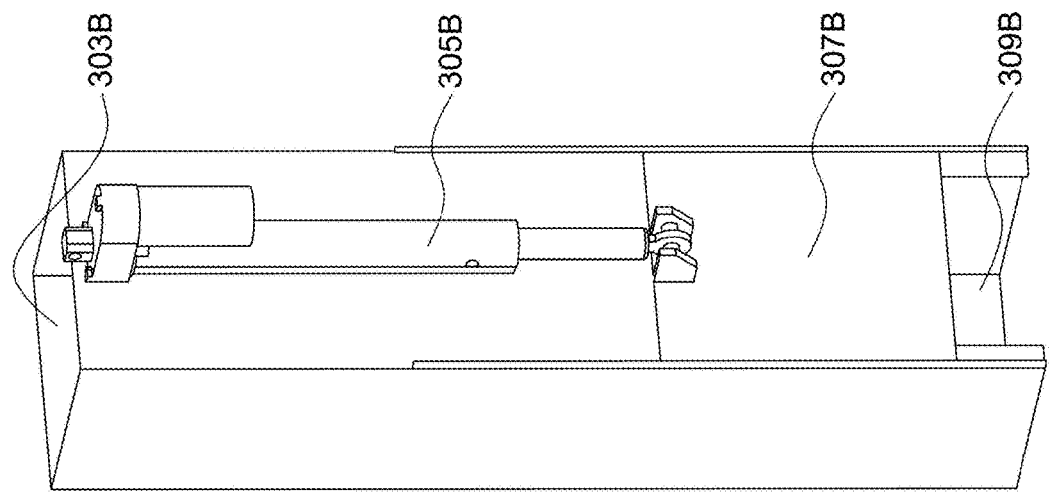
FIG. 3B illustrates a view of an exemplary vertical material constituent aperture mechanism whose gate is in a partially open position, in accordance with at least one embodiment.
Figure 3A:
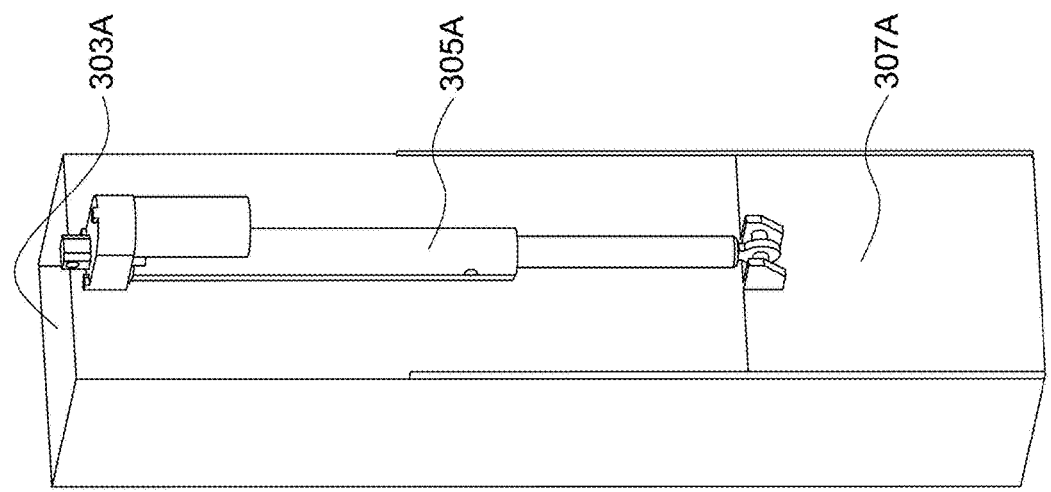
FIG. 3A illustrates an exemplary view of the vertical material constituent aperture mechanism whose gate is in a closed position, in accordance with at least one embodiment.

FIG. 3A illustrates an exemplary view of the vertical material constituent aperture mechanism whose gate is in a closed position, in accordance with at least one embodiment. FIG. 3A depicts a rectangular conduit 303A, an actuator 305A, and a closed gate 307A.

FIG. 3B illustrates a view of an exemplary vertical material constituent aperture mechanism whose gate is in a partially open position, in accordance with at least one embodiment. FIG. 3B depicts a rectangular conduit 303B, actuator 305B, a partially opened gate 307B, and a rectangular conduit 309B.

FIG. 3C illustrates a view of an exemplary vertical material constituent aperture mechanism whose gate is in a fully opened position, in accordance with at least one embodiment. FIG. 3C depicts a rectangular conduit 303C, an actuator 305C, a fully opened gate 307C, and a rectangular conduit 309C.

FIG. 4A illustrates a view of an exemplary front view of a row of the vertical material constituent capture mechanism, in accordance with at least one embodiment. FIG. 4A depicts 403A FIG. 4B vertical rectangular conduit and close up shown in 403B, flexible or rigid screw auger in a horizontal position 405A, and a motor 407A.

FIG. 4B illustrates a view of an exemplary close-up of FIGS. 4A and 403A front view of a row of vertical material constituent gate mechanism, in accordance with at least one embodiment. FIG. 4B depicts a close-up 403B of 403A, an actuator 405B, a vertical rectangular conduit 407B, a horizontal feeder conduit 409B, and a load cell and gate 411B.

Figure 5A:
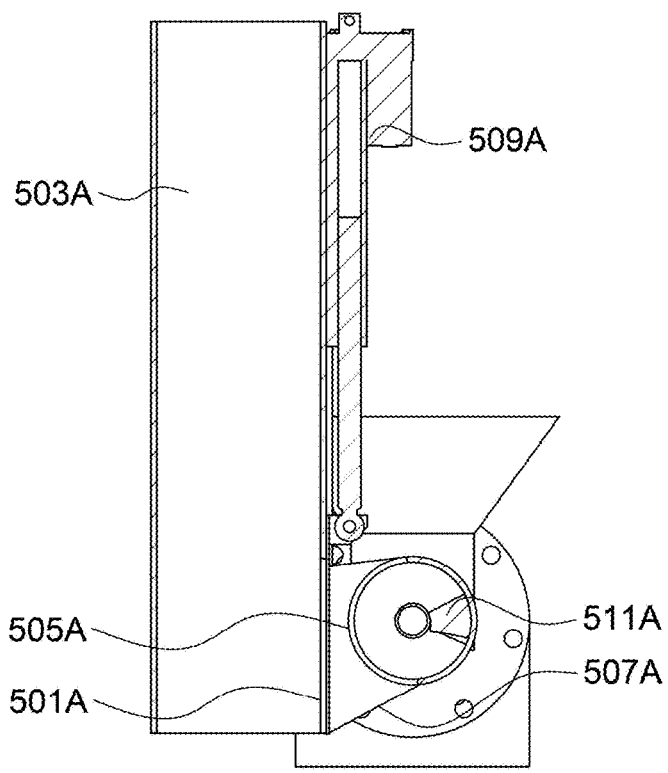
FIG. 5A illustrates a view of an exemplary side view of a vertical material constituent gate aperture, measurement mechanism, and cross-section of FIGS. 4B and 409B, in accordance with at least one embodiment.

FIG. 5A illustrates a view of an exemplary side view of a vertical material constituent gate aperture, measurement mechanism, and cross-section of FIGS. 4B and 409B, in accordance with at least one embodiment. FIG. 5A depicts a cross-section side view open gate of rectangular constituent measured conduit 501A, cross-section side view of rectangular constituent measured conduit 503A, cut away cross-section side view of constituent measured cylindrical open area of conduit that contains horizontal feeder auger stem 505A, cut away cross-section side view of cylindrical constituent open area and or second gate aperture weight measured within conduit horizontal feeder auger chamber 507A, electrical wires 509A, and horizontal feeder auger rib 511A.

Figure 5B:
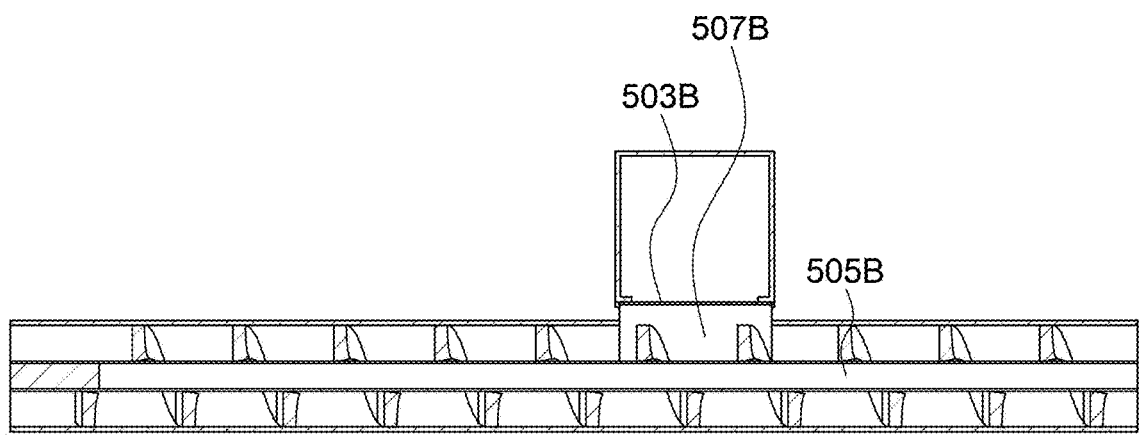
FIG. 5B illustrates a view of an exemplary cross-section view of a horizontal auger with gate and weight trigger measurement aperture, in accordance with at least one embodiment.

FIG. 5B illustrates a view of an exemplary cross-section view of a horizontal auger with gate and weight trigger measurement aperture, in accordance with at least one embodiment. FIG. 5B depicts the cut-through cross-section 503B of the open gate in FIGS. 5A and 501A cut through the cross-section view of horizontal feeder auger 505B, and cut through cross-section view 507B of horizontal feeder auger in FIG. 5A and 507A.

Figure 6A:
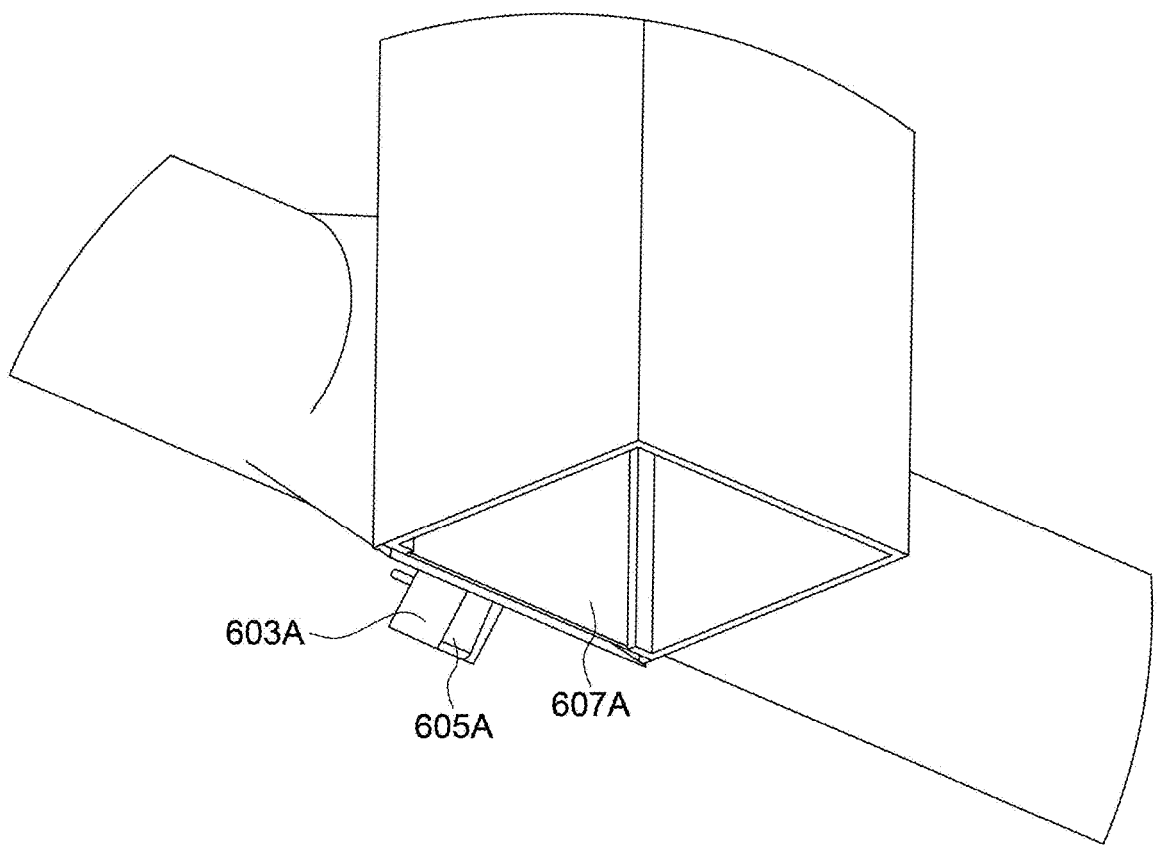
FIG. 6A illustrates an exemplary view of a load cell with a fully closed dispensing gate, in accordance with at least one embodiment.

FIG. 6A illustrates an exemplary view of a load cell with a fully closed dispensing gate, in accordance with at least one embodiment. FIG. 6A depicts a load cell mounting bracket 603A, load cell 605A, and a dispensing gate fully closed 607A.

Figure 6B:
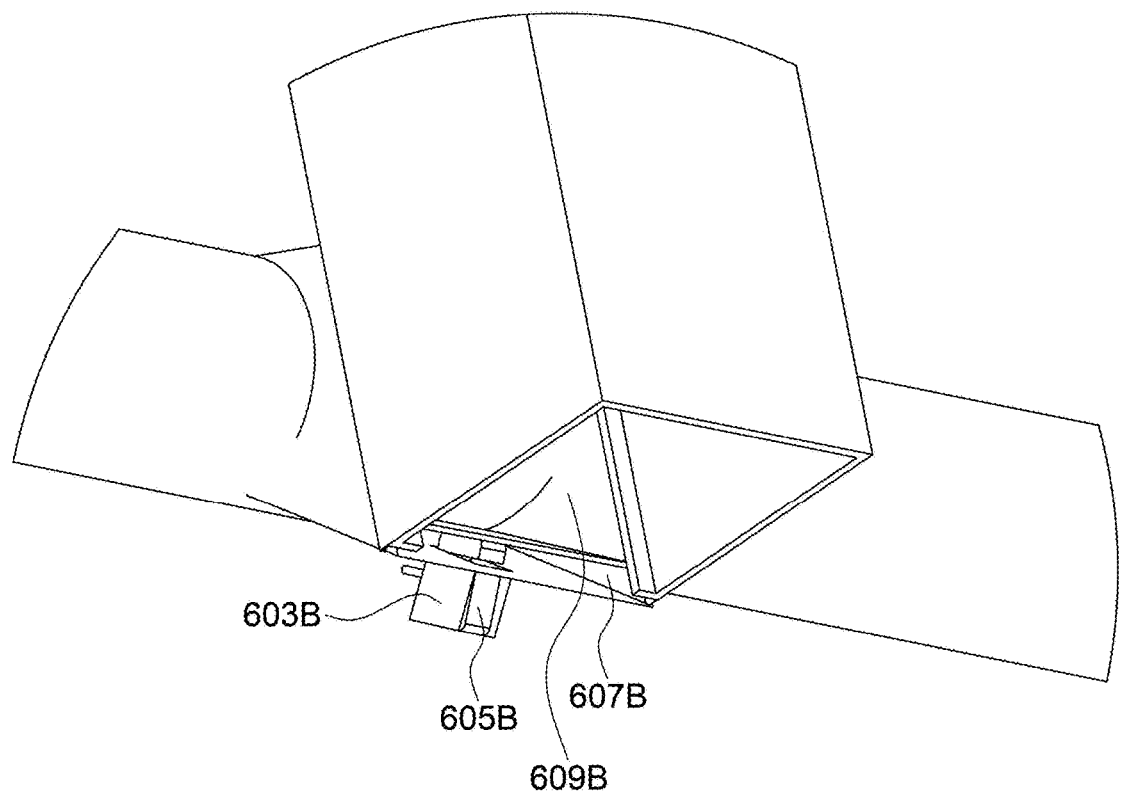
FIG. 6B illustrates an exemplary view of a load cell with a partially open dispensing gate, in accordance with at least one embodiment.

FIG. 6B illustrates an exemplary view of a load cell with a partially open dispensing gate, in accordance with at least one embodiment. FIG. 6B depicts a load cell mounting bracket 603B, a load cell 605B, a constituent discharging hopper bottom 607B, and dispensing gate partially open 609B.

Figure 7:
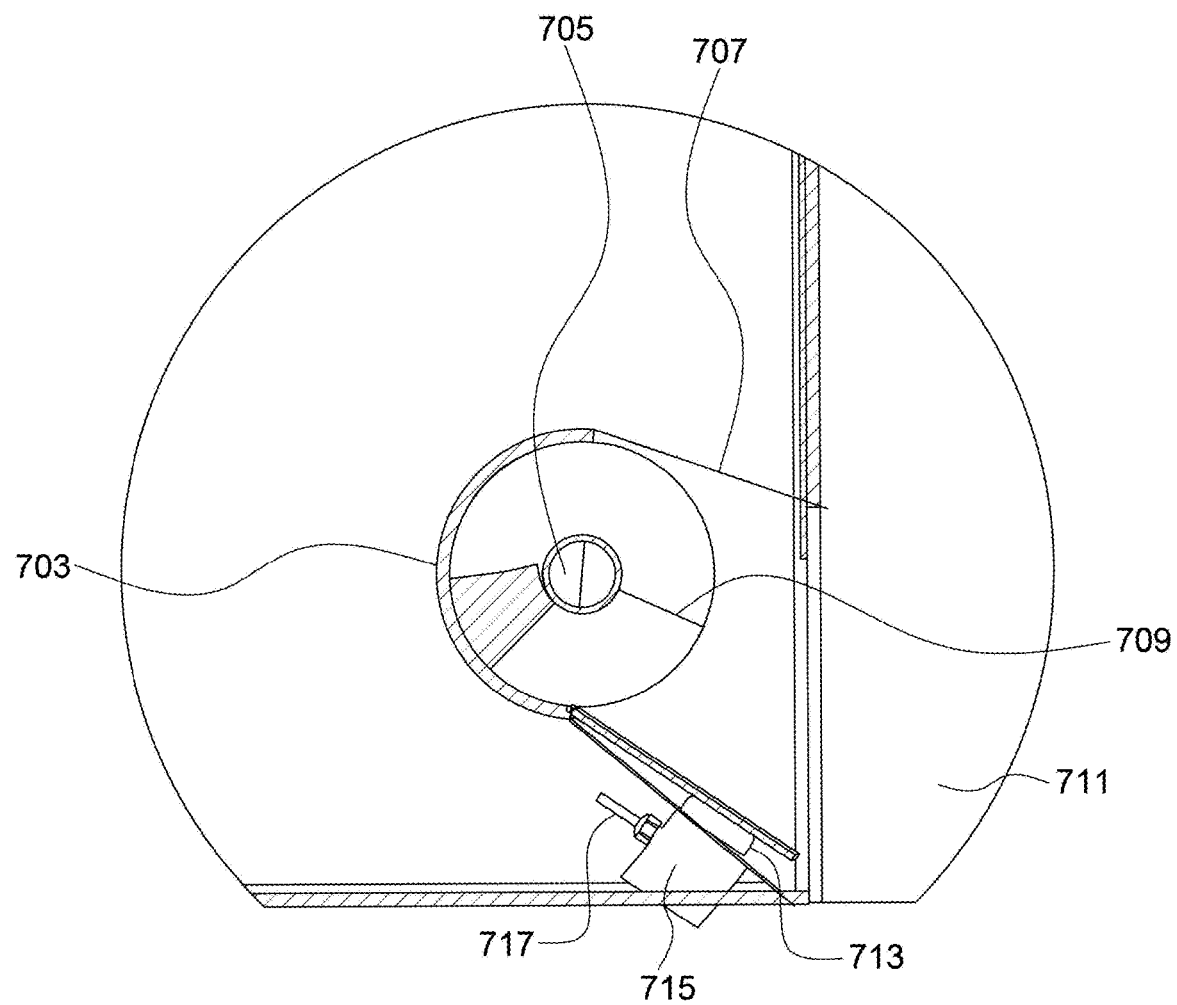
FIG. 7 illustrates an exemplary view of a cross cutaway of a load cell and dispensing gate assembly, in accordance with at least one embodiment.

FIG. 7 illustrates an exemplary view of across cutaway of a load cell and dispensing gate assembly, in accordance with at least one embodiment. FIG. 7 depicts dispensing auger outer conduit pipe 703, a dispensing auger shaft 705, material discharging hopper 707, auger rib or screw auger 709, constituent discharging box 711, load cell 713, load cell mounting bracket 715, and a load cell wire 717.

Figure 8C:
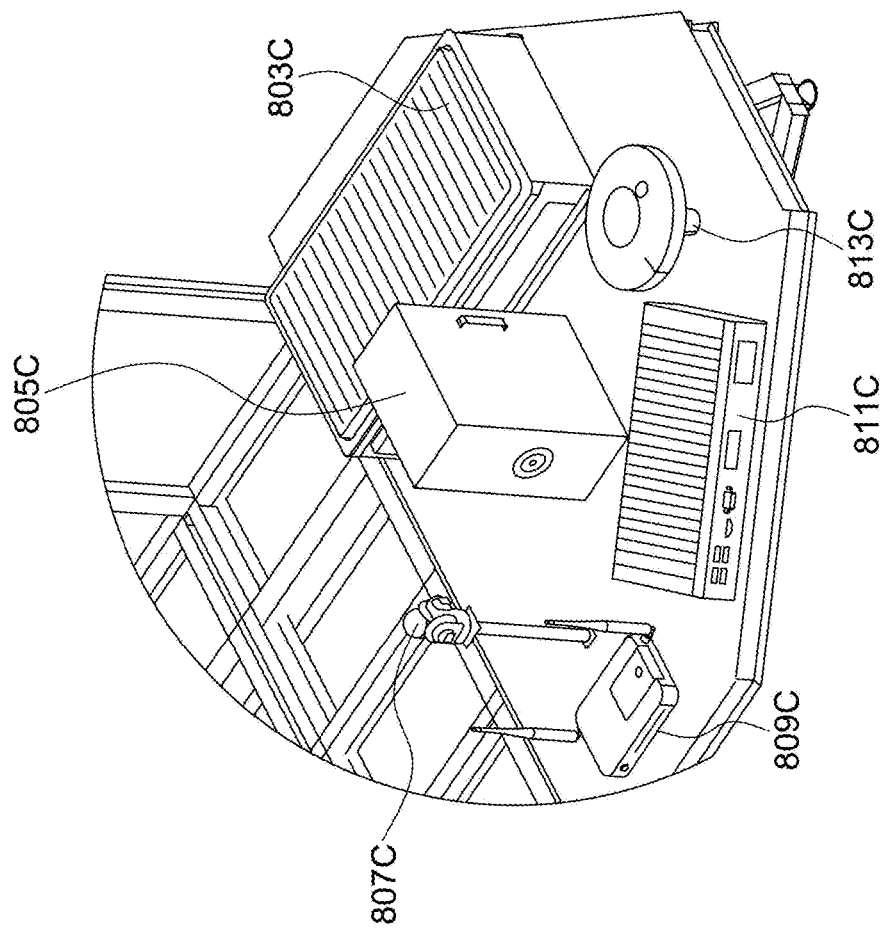
FIG. 8C illustrates an exemplary view of a close-up of components within the circle of FIGS. 8A and 805A, in accordance with at least one embodiment.
Figure 8B:
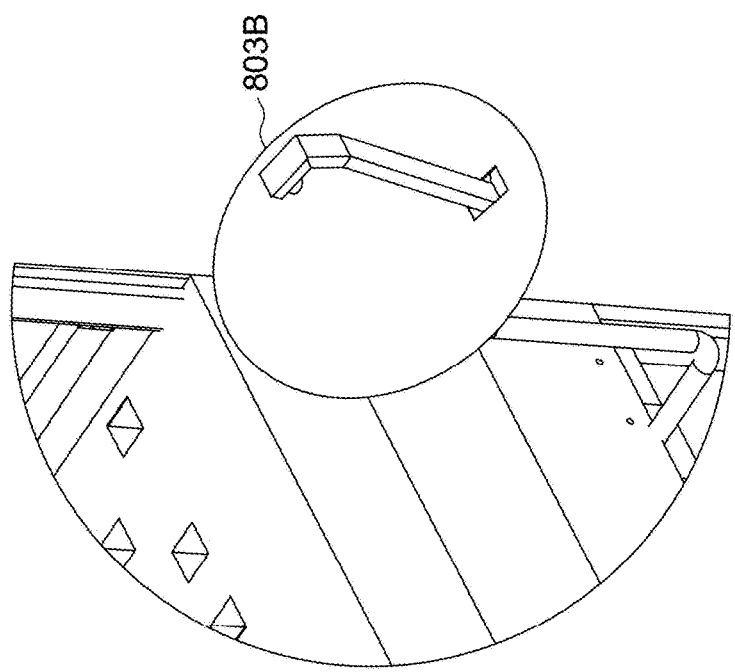
FIG. 8B illustrates an exemplary view of satellite communications dish, in accordance with at least one embodiment.

FIG. 8A illustrates an exemplary view of the communications platform of an injection drilling trailer with components seen in FIG. 8B and FIG. 8C, in accordance with at least one embodiment. FIG. 8A depicts a satellite communications dish 803A, communications platform 805A containing components seen in FIG. 8C.

FIG. 8B illustrates an exemplary view of satellite communications dish, in accordance with at least one embodiment. FIG. 8B depicts a satellite communications dish 803B.

FIG. 8C illustrates an exemplary view of a close-up of components within the circle of FIGS. 8A and 805A, in accordance with at least one embodiment. FIG. 8C depicts a fuel cell 803C, PLC 805C. AI Robot 807C, router 809C, computer 811C, and a GPS 813C.

Figure 9:
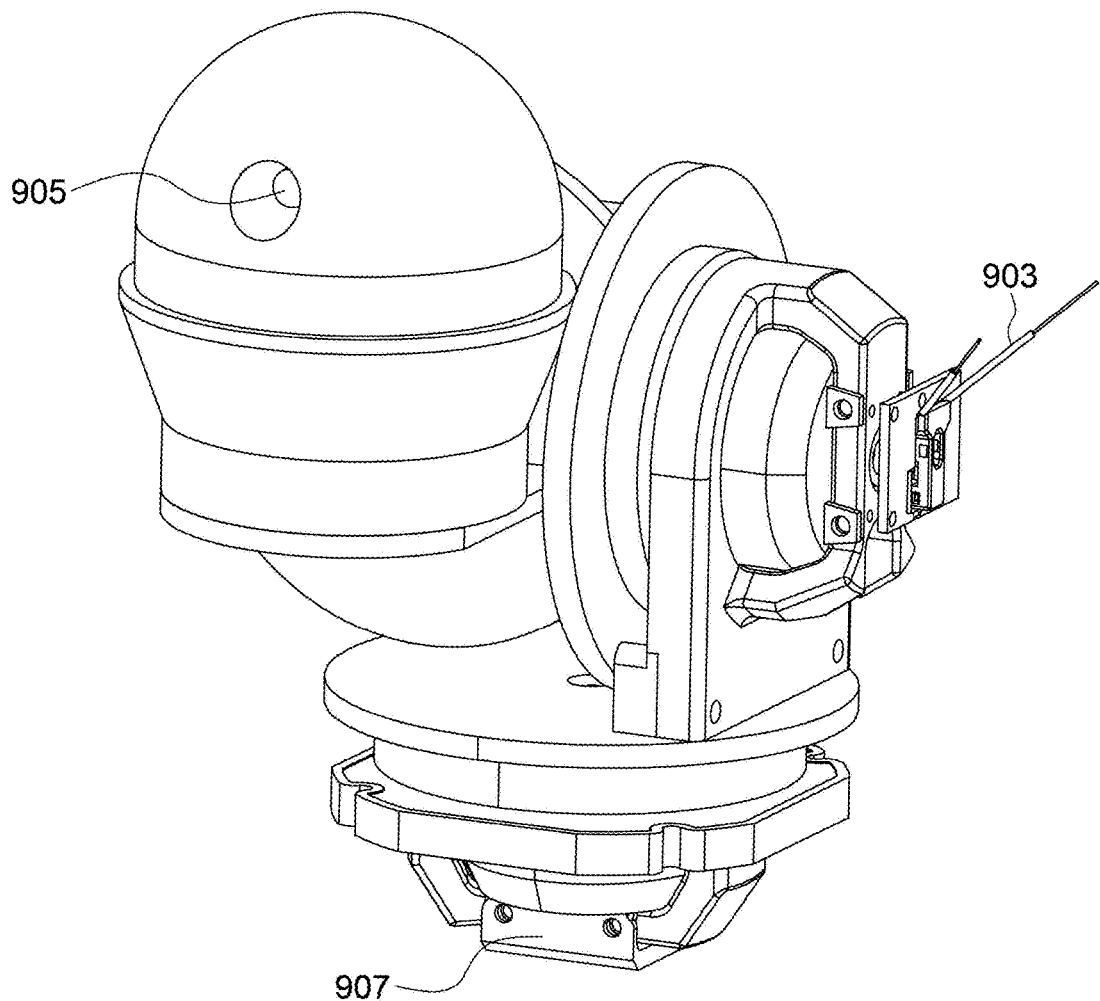
FIG. 9 illustrates an exemplary view of an AI robot, in accordance with at least one embodiment, in accordance with at least one embodiment.

FIG. 9 illustrates an exemplary view of an AI robot, in accordance with at least one embodiment, in accordance with at least one embodiment. FIG. 9A depicts a camera lens 903, gimbal 905, and antenna 907.

Figure 10A:
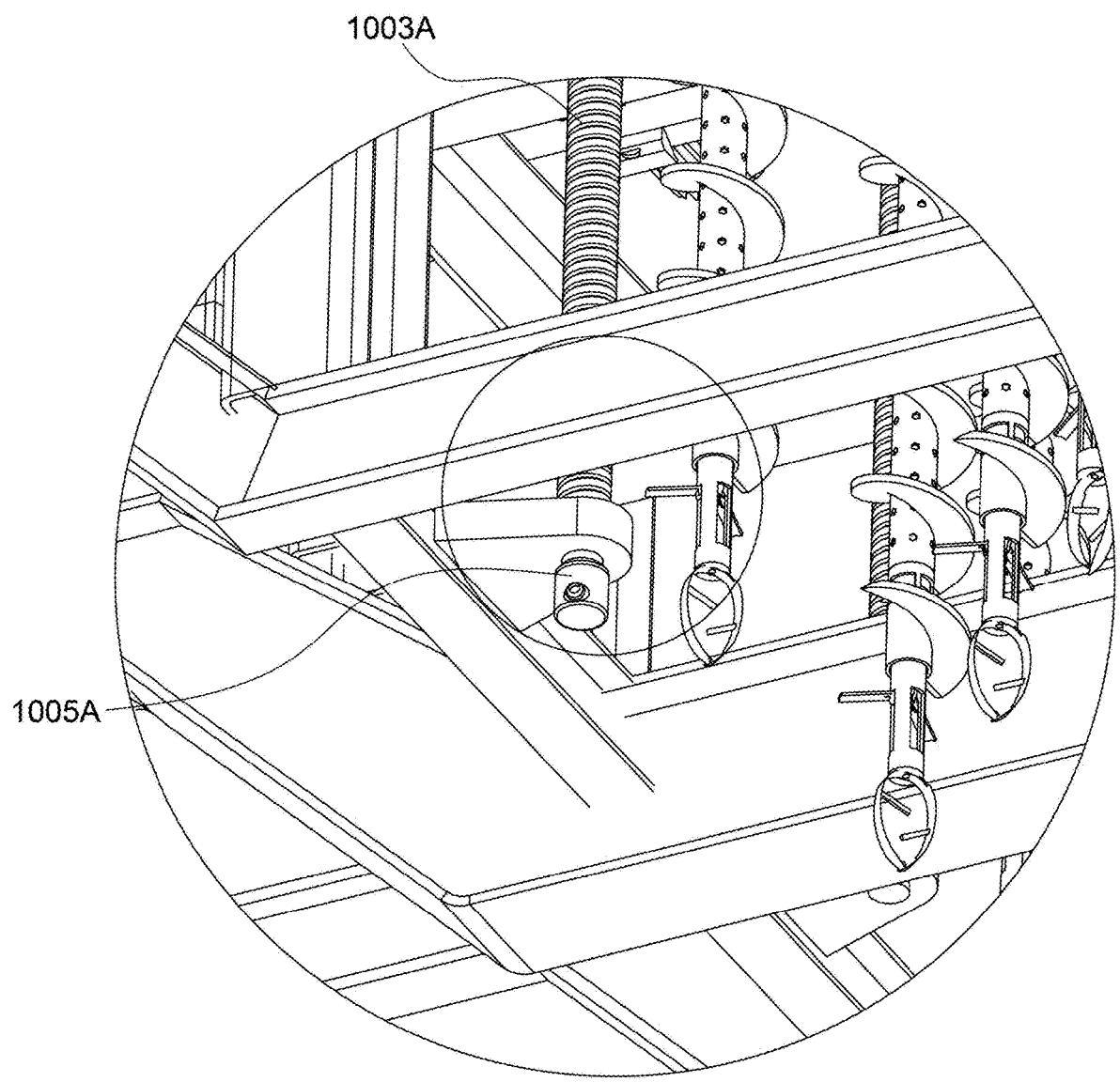
FIG. 10A illustrates an exemplary view of an encoder for lead screw revolution counting, in accordance with at least one embodiment.

FIG. 10A illustrates an exemplary view of an encoder for lead screw revolution counting, in accordance with at least one embodiment. FIG. 10A depicts a lead screw 1003A, and an encoder 1005A.

Figure 10B:
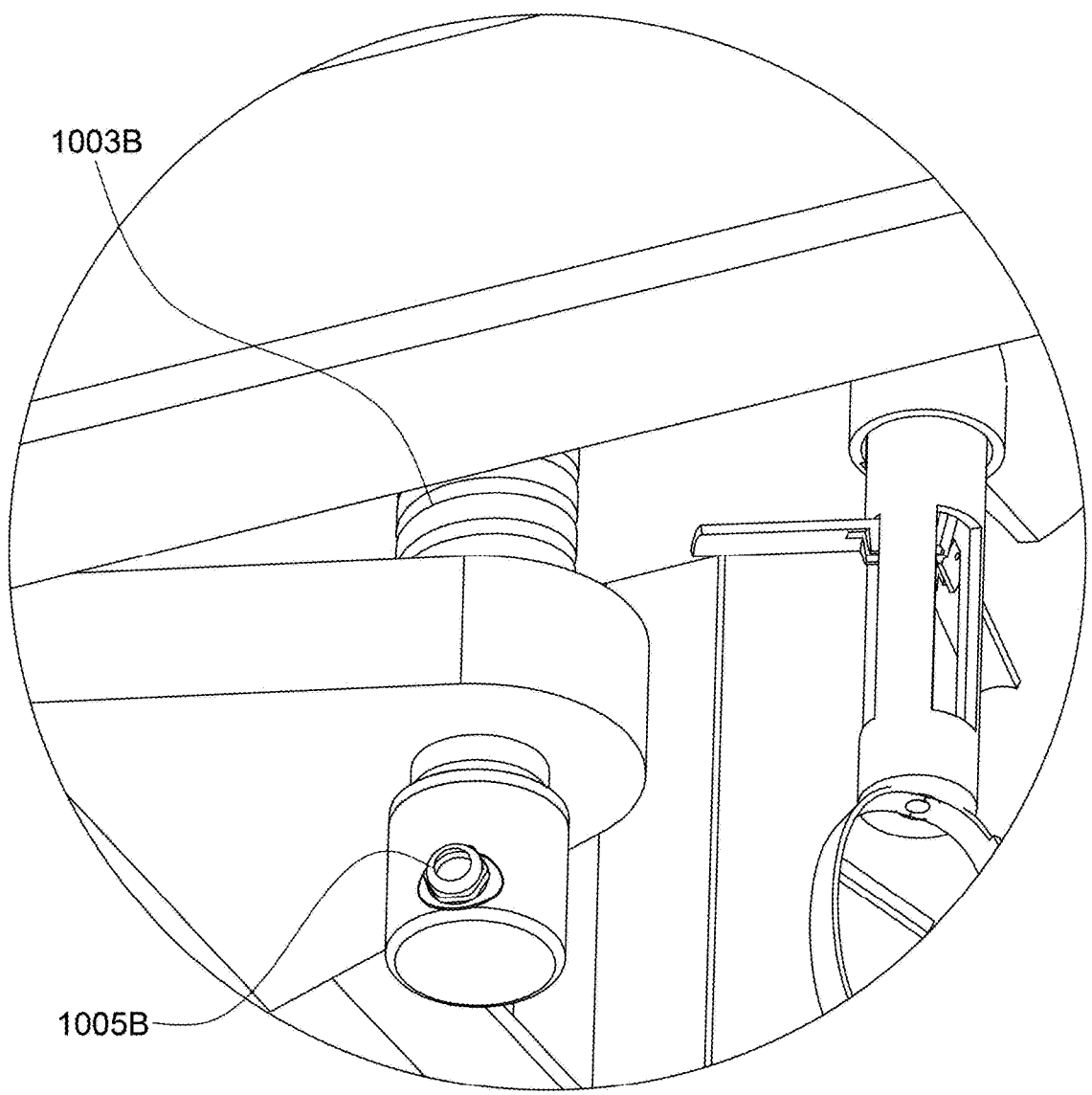
FIG. 10B illustrates an exemplary view of a close-up of FIG. 10A, an encoder for lead screw revolution counting, in accordance with at least one embodiment.

FIG. 10B illustrates an exemplary view of a close-up of FIG. 10A, an encoder for lead screw revolution counting, in accordance with at least one embodiment. FIG. 10B depicts a lead screw 1003B, and an encoder 1005B.

Figure 11:
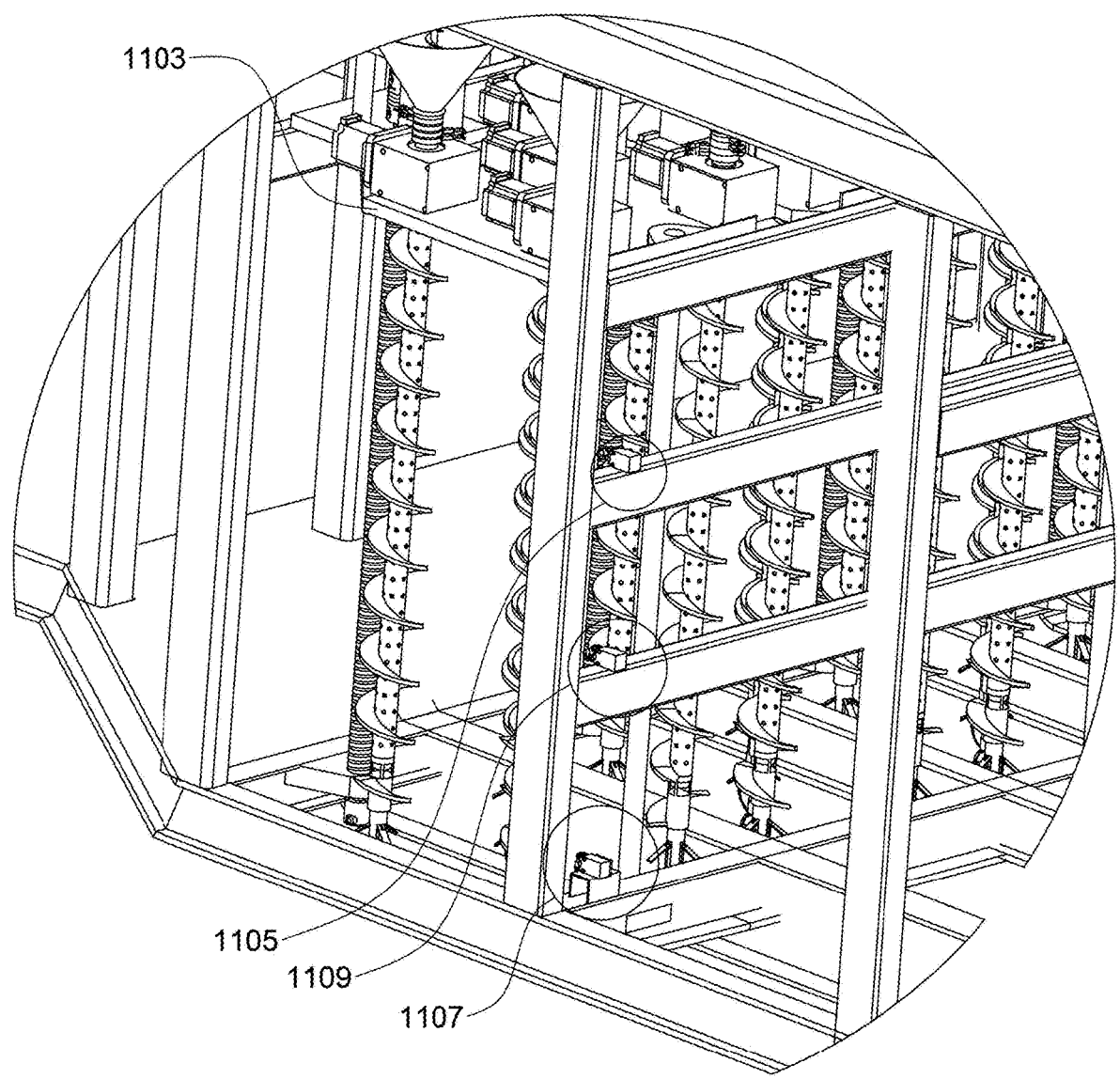
FIG. 11 illustrates an exemplary view of three limit switches, in accordance with at least one embodiment.

FIG. 11 illustrates an exemplary view of three limit switches, in accordance with at least one embodiment. FIG. 11 depicts an injection drill bit array platform 1103, limit switch 1105, 1107, and 1109.

Figure 12A:
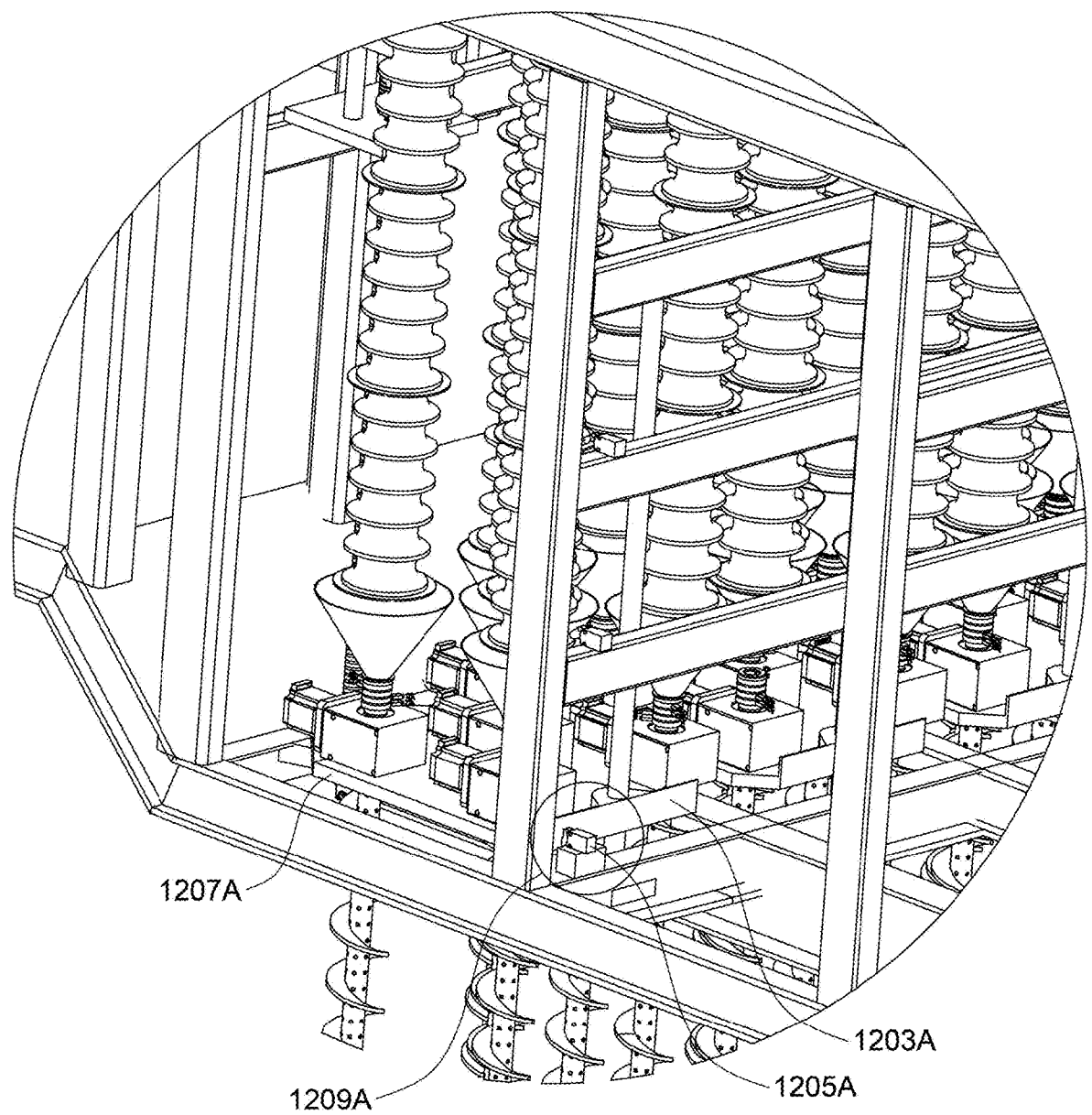
FIG. 12A illustrates an exemplary view of a limit switch that has been tripped by the injection drilling array platform having traveled to its limit setting, in accordance with at least one embodiment.

FIG. 12A illustrates an exemplary view of a limit switch that has been tripped by the injection drilling array platform having traveled to its limit setting, in accordance with at least one embodiment. FIG. 12A depicts a back wall of drilling array platform 1203A, limit switch 1205A, a drilling array platform 1207A, call out 1209A for close up of FIG. 106, hollow shaft injection drill bit 1211A, and a feeder auger 1213A.

Figure 12B:
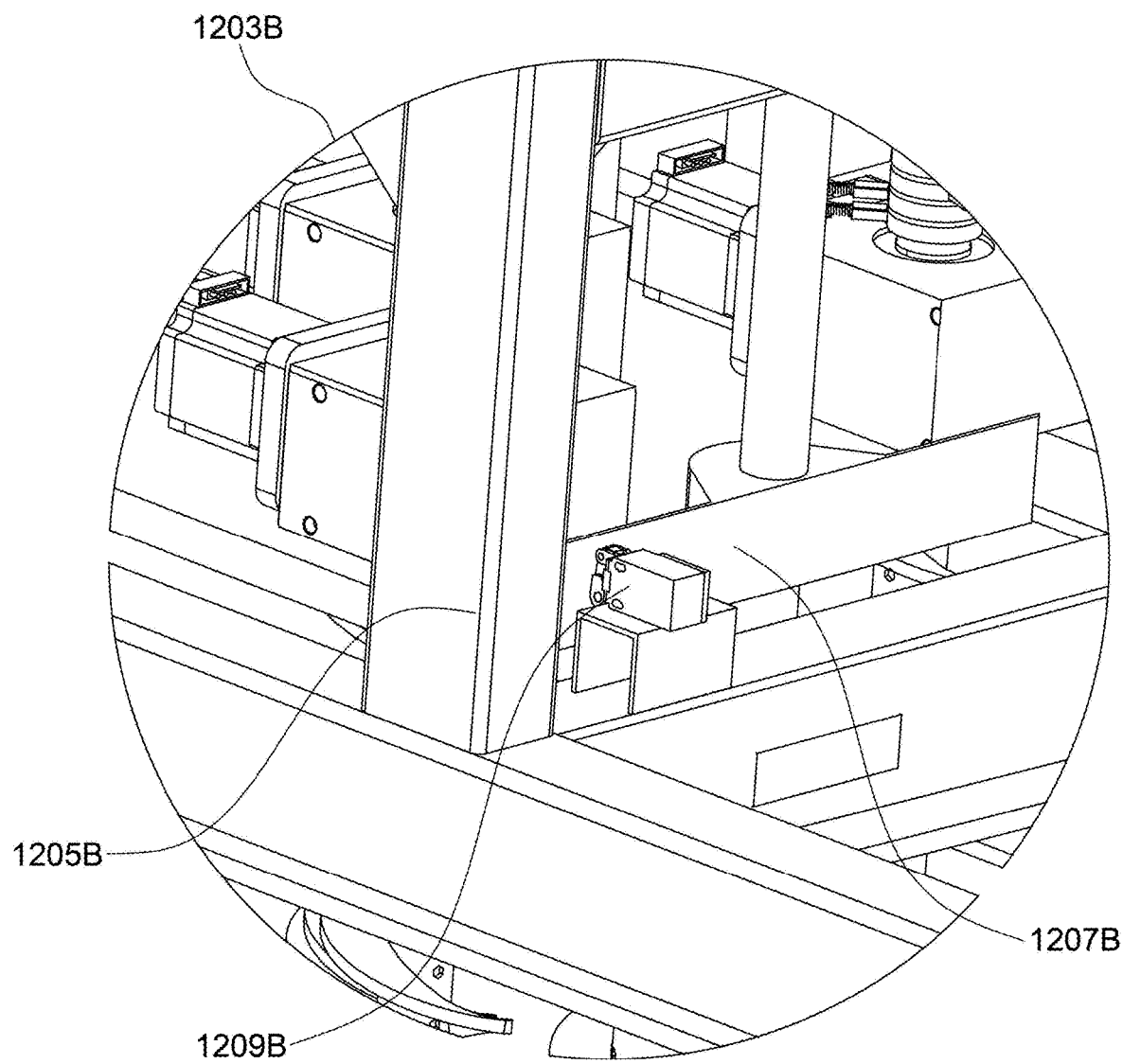
FIG. 12B illustrates an exemplary view of close up of FIG. 12A, in accordance with at least one embodiment.

FIG. 12B illustrates an exemplary view of close up of FIG. 12A, in accordance with at least one embodiment. FIG. 12B depicts a close-up 1203B of FIGS. 10A and 1009A, drilling array platform 1205B, the back wall of drilling array platform 1207B, and limit switch 1209B.

Further, the present specification related to a device for dispensing a plurality of constituent materials by one or more of weight, volume, flow, and time interval through one or more actuated dispenser openings connected to one or more of a plurality of chambers and a plurality of vessels. The device includes a gate (411B); an actuator a physical gate (405B); one or more load cells (605A. 605B, and 713); an artificial intelligence (AI) robot (807C); a lens (905); a computer (811C); a programmable logic controller (PLC) (805C); an encoder (1005B); a limit switch (1209B); and a sensor. The gate (411B), the actuator a physical gate (405B); and the load cell (713) enable a sequential dispensing of one or more constituents at targeted depths via the AI robot (807C), the lens (905), the computer (811C), the PLC (805C); the encoder (1005B), the limit switch (1209B), and the sensor. The gate (411B), the actuator a physical gate (405B); and the load cell (713) are used to dispense by the load cell (605A) measuring the constituents by weight.

In an embodiment, the device enables the lateral feeding of the constituents to transition into a vertical gravity conduit.

In an embodiment, the gate (411B), the actuator a physical gate (405B), and the load cell (713) enable dispensing of the targeted volumes of the constituents via the AI robot (807C), the lens (905), the computer (811C), the PLC (805C), the encoder (1005B), the limit switch (1209B), and the sensor.

In an embodiment, the gate (411B), the actuator a physical gate (405B), and the load cell (713) enable dispensing of targeted volumes of the multiple constituents via the AI robot (807C), the lens (905), the computer (811C), the PLC (805C), the encoder (1005B), the limit switch (1209B), and the sensor.

In an embodiment, the gate (411B), the actuator a physical gate (405B), and the load cell (713) are used to dispense by physical volume the space a constituent takes up via the AI robot (807C), the lens (905), the computer (811C), the PLC (805C), the encoder (1005B), the limit switch (1209B), and the sensor.

In an embodiment, the gate (411B), the actuator a physical gate (405B), and the load cell (713) via the AI robot (807C), the lens (905), the computer (811C), the PLC (805C), the encoder (1005B), the limit switch (1209B), and the sensor transmit instructions to enable sequential dispensing of the constituents at coordinates of a Global Positioning System (GPS)(813C).

In an embodiment, the gate (411B), the actuator a physical gate (405B), and the load cell (713) enable the refilling post-first injection filling of one or more hollow shaft drill bits (1211A) with the constituents targeted for specific depths to achieve physical space volume dispensing efficacy.

In an embodiment, the gate (411B), the actuator a physical gate (405B), and the load cell (713) enable the refilling post-first injection filling of the one or more hollow shaft drill bits (1211A) with the constituents targeted for specific depths to achieve weight volume efficacy.

In an embodiment, the gate (411B), the actuator a physical gate (405B), and the load cell (713) enable specific dispensing volumes for subsurface injection of live organisms, micro-organisms, bacteria, fungi, and constituents through the one or more hollow shaft drill bits (1211A).

In an embodiment, the gate (411B), the actuator a physical gate (405B), and the load cell (713) enable dispensing for time interval injections by the encoder (1005B) revolution counting of a lead screw (1003A) in concert with the AI robot (807C), the lens (905), the computer (811C), the PLC (805C), the limit switch (1209B), and the sensor-controlled at the GPS (813C) location.

In an embodiment, the gate (411B), the actuator a physical gate (405B), and the load cell (713) enable dispensing for time interval injections by the limit switch (1209B) distance traveled of the lead screw (1003A) in concert with the AI robot (807C), the lens (905), the computer (811C), the PLC (805C), the limit switch (1209B), and the sensor-controlled at the GPS (813C) location.

In an embodiment, the gate (411B), the actuator a physical gate (405B), and the load cell (713) enable the injection to dispense volumes during a descending drilling process of one or more hollow shaft drill bits (1211A).

In an embodiment, the gate (411B), the actuator a physical gate (405B), and the load cell (713) enable secondary dispensing for subsequent injection during the ascending and then a secondary descent drilling process of the one or more hollow shaft drill bits (1211A).

In an embodiment, the gate (411B), the actuator a physical gate (405B), and the load cell (713) enable dispensed volumes into one or more hollow shaft drill bits (1211A).

In an embodiment, the gate (411B), the actuator a physical gate (405B), and the load cell (713) enable dispensed volumes into one or more feeder augers (1213A).

In an embodiment, the gate (411B), the actuator a physical gate (405B), and the load cell (713) enable dispensed volumes into the one or more hollow shaft drill bits (1211A) to act independently.

In an embodiment, the gate (411B), the actuator a physical gate (405B), and the load cell (713) enable dispensed volumes into the feeder augers (1213A) to act independently.

In an embodiment, the gate (411B), the actuator a physical gate (405B), and the load cell (713) enable independent dispensing to the one or more hollow shaft drill bits (1211A) exhibiting a plurality of behaviors comprising resistance, indicated by sensor time interval, have individually stop drilling, or to stop at an interval of time, or specific achieved depth.

In an embodiment, the gate (411B), the actuator a physical gate (405B), and the load cell (713) enable independent dispensing to the feeder augers (1213A) exhibiting behaviors comprising resistance, indicated by sensor time interval, have individually stop drilling, or to stop at an interval of time, or specific achieved depth.

In an embodiment, the gate (411B), the actuator a physical gate (405B), and the load cell (713) enable a stop or place on hold from dispense receipt of signal through one or more of one or more sensor(s), the AI robot (807C), the lens (905), the computer (811C), the PLC (805C), the limit switch (1209B), the encoder (1005B), and the sensor-controlled at the GPS (813C) location from an independent hollow shaft drill bits (1211A) or a plurality of hollow shaft drill bits (1211A) to individually stop dispensing upon sensor detection of specified impediments.

In an embodiment, the gate (411B), the actuator a physical gate (405B), and the load cell (713) enable a stop dispense receipt of signal through the sensor(s) and the AI robot (807C), the lens (905), the computer (811C), the PLC (805C), the limit switch (1209B), the encoder (1005B) and the sensor-controlled at the GPS (813C) location from the independent hollow shaft drill bits (1211A) and the feeder augers (1213A) to individually stop dispensing upon sensor detection of specified resistance and resume filling upon receipt of re-actuation of drilling to a new depth.

In an embodiment, the gate (411B), the actuator a physical gate (405B), and the load cell (713) enable via the AI robot (807C), the lens (905), the computer (811C), the PLC (805C), and the sensor, Lidar or similar databases and other subsurface map overlay subsurface actions to continue with prescriptive volume dispensing, not to dispense or to dispense more or less based on database reference and the GPS (813C) location.

In an embodiment, the gate (411B), the actuator a physical gate (405B), and the load cell (713) enable dynamic sample recording of information to the AI robot (807C), the lens (905), the computer (811C), the PLC (805C), or cloud of specific depth (803B) at the GPS (813C) location and dispense in coordination with a database matching reference.

In an embodiment, the gate (411B), the actuator a physical gate (405B), and the load cell (713) enable actuation through dynamic electromagnetic charging of devices by way of example but not limited to the gates within the structure of the dispensing assembly by being made of a magnetic or ferrous metal.

In an embodiment, the gate (411B), the actuator a physical gate (405B), and the load cell (713) enable the dynamic actuation of the gate through any motorized or mechanical means comprising an electromagnet, a solenoid, and an actuated valve.

In an embodiment, the gate (411B), the actuator a physical gate (405B), and the load cell (713) enable increasing the global inventory of aerable land with appropriate porosity constituents prescriptive for its ternary type.

In an embodiment, the gate (411B), the actuator a physical gate (405B), and the load cell (713) enable porosity modification as a function of the shape and size of solid constituents comprising aggregates affecting the bulk mass density of the targeted Horizon.

In an embodiment, the gate (411B), the actuator a physical gate (405B), and the load cell (713) enable dispensing and subsequent injection of living constituents comprising aneic earthworms, fungi, larva, and pupi that can improve porosity by penetrating lower horizons.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms enclosed. On the contrary, the intention is to cover all modifications, alternative constructions, and equivalents falling within the spirit and scope of the invention, as defined in the appended claims. Thus, it is intended that the present invention cover the modifications and variations of this invention, provided they are within the scope of the appended claims and their equivalents.

FIG. 1A

103A Injection Drilling Trailer Constituent Compartment with arrays of vertical rectangular conduits with actuated gates and horizontal feeder augers

105A Injection Drilling Trailer Hoppers and Drills

107A PLC, Computer or AI unit

FIG. 1B
103B Injection Drilling Trailer Constituent Compartment showing an array of unpopulated rectangle conduits within the platform for arrays of vertical rectangular conduits with actuated gates and horizontal feeder augers.
FIG. 1C
103C Close up one vertical rectangular conduit within populated arrays of vertical rectangular conduits with actuated gates and horizontal feeder augers.
105C Actuator
107C Gate
109C Horizontal Feeder Auger
FIG. 2A
203A Rectangular Conduit with Actuator for Gate
205A Feeder Auger for Rectangular Conduit
207A Motor for Rectangular Conduit Feeder Auger
FIG. 2B
203B Hollow area of Rectangular Conduit
205B Actuator
207B Partially Actuated Opened Gate
209B Feeder Auger for Rectangular Conduit
FIG. 3A
303A Rectangular Conduit
305A Actuator
307A Closed Gate
FIG. 3B
303B Rectangular Conduit
305B Actuator
307B Partially Opened Gate
309B Rectangular Conduit
FIG. 3C
303C Rectangular Conduit
305C Actuator
307C Fully Opened Gate
309C Rectangular Conduit
FIG. 4A
403A FIG. 4B Vertical Rectangular Conduit and Close Up shown in 403B
405A Flexible or Rigid Screw Auger In A Horizontal Position
407A Motor
FIG. 4B
403B Close Up of 403A
405B Actuator
407B Vertical Rectangular Conduit
409B Horizontal Feeder Conduit
411B Load Cell And Gate
FIG. 5A
501A Cross Section Side view open gate of rectangular constituent measured conduit
503A Cross Section Side view of rectangular constituent measured conduit
505A Cut Away Cross Section Side view of constituent measured cylindrical open area of conduit that contains horizontal feeder auger stem
507A Cut Away Cross Section Side view of cylindrical constituent open area and or second gate aperture weight measured within conduit horizontal feeder auger chamber
509A Electrical Wires
511A Horizontal feeder auger rib
FIG. 5B
503B Cut Through Cross Section of Open Gate in FIG. 5A and #501A
505B Cut Through Cross Section view of horizontal feeder auger
507B Cut Through Cross Section view of horizontal feeder auger in FIG. 5A and #507A
FIG. 6A
603A Load Cell Mounting Bracket
605A Load Cell
607A Dispensing Gate Fully Closed
FIG. 6B
603B Load Cell Mounting Bracket
605B Load Cell
607B Constituent Discharging Hopper Bottom
609B Dispensing Gate Partially Open
FIG. 7
703 Dispensing Auger Outer Conduit Pipe
705 Dispensing Auger Shaft
707 Material Discharging Hopper
709 Auger Rib or Screw Auger
711 Constituent Discharging Box
713 Load Cell
715 Load Cell Mounting Bracket
717 Load Cell Wire
FIG. 8A
803A Satellite Communications Dish
805A Communications Platform containing components seen in FIG. 8C
FIG. 8B
803B Satellite Communications Dish
FIG. 8C
803C Fuel Cell
805C PLC
807C AI Robot
809C Router
811C Computer
813C GPS
FIG. 9
903 Camera Lens
905 Gimbal
907 Antenna
FIG. 10A
1003A Lead Screw
1005A Encoder
FIG. 10B
1003B Lead Screw
1005B Encoder
FIG. 11
1103 Injection Drill Bit Array Platform
1105 Limit Switch
1107 Limit Switch
1109 Limit Switch
FIG. 12A
1203A Back Wall of Drilling Array Platform
1205A Limit Switch
1207A Drilling Array Platform
01209A Call Out for Close Up of FIG. 10B
1211A Hollow Shaft Injection Drill Bit
1213A Feeder Auger
FIG. 12B
1203B Close Up of FIG. 10A and #1009A
1205B Drilling Array Platform
1207B Back Wall of Drilling Array Platform
1209B Limit Switch

The invention claimed is:
1. A device for dispensing a plurality of constituent materials by one or more of weight, volumes, flows, time intervals and depths through one or more actuated dispenser openings connected to one or more of a plurality of chambers and a plurality of vessels, comprising:

a gate;
an actuator comprising a physical gate;
one or more load cells;
an artificial intelligence (AI) robot;
a lens;
a computer;
a programmable logic controller (PLC);
an encoder;
a limit switch; and
a sensor,
wherein the gate, the actuator comprising a physical gate, and the load cell enable a sequential dispensing of one or more constituents at targeted depths via the AI robot, the lens, the computer, the PLC, the encoder, the limit switch, and the sensor,
wherein the gate, the actuator comprising a physical gate, and the load cell are used to dispense by the load cell measuring the constituents by weight.

2. The device as claimed in claim 1 enables the lateral feeding of the constituents to transition into a vertical gravity conduit.

3. The device as claimed in claim 1, wherein the gate, the actuator comprising a physical gate, and the load cell enable dispensing of the targeted volumes of the constituents via the AI robot, the lens, the computer, the PLC, the encoder, the limit switch, and the sensor.

4. The device as claimed in claim 1, wherein the gate, the actuator comprising a physical gate, and the load cell are used to dispense by physical space volume of a constituent takes up via the AI robot, the lens, the computer, the PLC, the encoder, the limit switch, and the sensor.

5. The device as claimed in claim 1, wherein the gate, the actuator comprising a physical gate, and the load cell via the AI robot, the lens, the computer, the PLC, the encoder, the limit switch, and the sensor transmit instructions to enable sequential dispensing of the constituents at coordinates of a Global Positioning System.

6. The device as claimed in claim 1, wherein the gate, the actuator comprising a physical gate, and the load cell enable the refilling post first injection filling of one or more hollow shaft drill bits with the constituents targeted for specific depths to achieve physical space volume dispensing efficacy.

7. The device as claimed in claim 1, wherein the gate, the actuator comprising a physical gate, and the load cell enable the refilling post first injection filling of the one or more hollow shaft drill bits with the constituents targeted for specific depths to achieve weight volume efficacy.

8. The device as claimed in claim 1, wherein the gate, the actuator comprising a physical gate, and the load cell enable specific dispensing volumes for subsurface injection of live organisms, micro-organisms, bacteria, fungi, constituents through the one or more hollow shaft drill bits.

9. The device as claimed in claim 1, wherein the gate, the actuator comprising a physical gate, and the load cell enable dispensing for time interval injections by the encoder revolution counting of a lead screw in concert with the AI robot, the lens, the computer, the PLC, the limit switch, and the sensor-controlled at the GPS location.

10. The device as claimed in claim 1, wherein the gate, the actuator comprising a physical gate, and the load cell enable dispensing for time interval injections by the limit switch distance traveled of the lead screw in concert with the AI robot, the lens, the computer, the PLC, the limit switch, and the sensor-controlled at the GPS location.

11. The device as claimed in claim 1, wherein the gate, the actuator comprising a physical gate, and the load cell enable injection dispensed volumes during a descending drilling process of the one or more hollow shaft drill bits.

12. The device as claimed in claim 1, wherein the gate, the actuator comprising a physical gate, and the load cell enable secondary dispensing for subsequent injection during the ascending and then a secondary descent drilling process of the one or more hollow shaft drill bits.

13. The device as claimed in claim 1, wherein the gate, the actuator comprising a physical gate, and the load cell enable dispensed volumes into the one or more hollow shaft drill bits.

14. The aperture assembly as claimed in claim 1, wherein the gate, the actuator comprising a physical gate, and the load cell enable dispensed volumes into one or more feeder augers.

15. The device as claimed in claim 1, wherein the gate, the actuator comprising a physical gate, and the load cell enable dispensed volumes into the one or more hollow shaft drill bits to act independently.

16. The device as claimed in claim 1, wherein the gate, the actuator comprising a physical gate, and the load cell enable dispensed volumes into and the feeder augers to act independently.

17. The device as claimed in claim 1, wherein the gate, the actuator comprising a physical gate, and the load cell enable independent dispensing to the one or more hollow shaft drill bits exhibiting a plurality of behaviors comprising resistance, indicated by sensor time interval, have individually stop drilling, or to stop at an interval of time, or specific achieved depth.

18. The device as claimed in claim 1, wherein the gate, the actuator comprising a physical gate, and the load cell enable independent dispensing to the feeder augers exhibiting behaviors comprising resistance, indicated by sensor time interval, have individually stop drilling, or to stop at an interval of time, or specific achieved depth.

19. The device as claimed in claim 1, wherein the gate, the actuator comprising a physical gate, and the load cell enable a stop or place on hold from dispense receipt of signal through one or more of one or more sensor(s), the AI robot, the lens, the computer, the PLC, the limit switch, the encoder, and the sensor-controlled at the GPS location from an independent hollow shaft drill bits or a plurality of hollow shaft drill bits to individually stop dispensing upon sensor detection of specified impediments.

20. The device as claimed in claim 1, wherein the gate, the actuator comprising a physical gate, and the load cell enable a stop dispense receipt of signal through the sensor(s) and the AI robot, the lens, the computer, the PLC, the limit switch, the encoder, and the sensor-controlled at the GPS location from the independent hollow shaft drill bits and the feeder augers to individually stop dispensing upon sensor detection of specified resistance and resume filling upon receipt of re-actuation of drilling to a new depth.

21. The device as claimed in claim 1, wherein the gate, the actuator comprising a physical gate, and the load cell enable via the AI robot, the lens, the computer, the PLC, and the sensor, Lidar or similar databases and other subsurface map overlay subsurface actions to continue with prescriptive volume dispensing, not to dispense or to dispense more or less based on database reference and the GPS location.

22. The device as claimed in claim 1, wherein the gate, the actuator comprising a physical gate, and the load cell enable dynamic sample recording of information to the AI robot, the lens, the computer, the PLC, or cloud of specific depth at the GPS location and dispense in coordination with a database matching reference.

23. The device as claimed in claim 1, wherein the gate, the actuator comprising a physical gate, and the load cell enable actuation through dynamic electromagnetic charging of devices by way of example but not limited to the gates within the structure of the dispensing assembly by being made of a magnetic or ferrous metal.

24. The device as claimed in claim 1, wherein the gate, the actuator comprising a physical gate, and the load cell enable the dynamic actuation of the gate through any motorized or mechanical means comprising an electromagnet, a solenoid, and an actuated valve.

25. The device as claimed in claim 1, wherein the gate, the actuator comprising a physical gate, and the load cell enable increasing the global inventory of arable land with appropriate porosity constituents prescriptive for its ternary type.

26. The device assembly as claimed in claim 1, wherein the gate, the actuator comprising a physical gate, and the load cell enable porosity modification is a function of the shape and size of solid constituents comprising aggregates affecting the bulk mass density of the targeted Horizon.

27. The device as claimed in claim 1, wherein the gate, the actuator comprising a physical gate, and the load cell enable dispensing and subsequent injection of living constituents comprising aneic earthworms, fungi, larva and pupi that can improve porosity by penetrating lower horizons.

* * * * *